(12) United States Patent
Pei et al.

(10) Patent No.: US 11,768,139 B2
(45) Date of Patent: Sep. 26, 2023

(54) ALTERNATING STRESS FATIGUE TESTING EQUIPMENT

(71) Applicant: Institute of Geology and Geophysics, Chinese Academy of Sciences, Beijing (CN)

(72) Inventors: Renzhong Pei, Beijing (CN); Zhongxing Wang, Beijing (CN); Jiansheng Du, Beijing (CN); Jian Zheng, Beijing (CN); Xinzhen He, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 120 days.

(21) Appl. No.: 17/587,620

(22) Filed: Jan. 28, 2022

(65) Prior Publication Data

US 2023/0020690 A1 Jan. 19, 2023

Related U.S. Application Data

(63) Continuation of application No. PCT/CN2021/106331, filed on Jul. 14, 2021.

(30) Foreign Application Priority Data

Feb. 25, 2021 (CN) .......................... 202110207413.7

(51) Int. Cl.
*G01N 3/20* (2006.01)
*G01N 3/04* (2006.01)
(Continued)

(52) U.S. Cl.
CPC ............. *G01N 3/20* (2013.01); *E21B 47/007* (2020.05); *G01N 3/04* (2013.01); *G01N 2203/0073* (2013.01); *G01N 2203/0266* (2013.01)

(58) Field of Classification Search
CPC .. G01N 3/20; G01N 3/00; G01N 3/02; G01N 3/22; G01N 3/42; G01N 3/38;
(Continued)

(56) References Cited

FOREIGN PATENT DOCUMENTS

| CN | 102141494 A | 8/2011 |
|----|-------------|--------|
| CN | 102410963 A | 4/2012 |

(Continued)

OTHER PUBLICATIONS

International Search Report of PCT/CN2021/106331.

*Primary Examiner* — Brandi N Hopkins

(57) ABSTRACT

The present invention relates to alternating stress fatigue testing equipment. The alternating stress fatigue testing equipment includes a pedestal on which linear guide rails are arranged; a deflection loading device which is arranged on the pedestal and configured to, in response to a clamped to-be-measured object being driven to slide to a first position, enable the to-be-measured object to be bent to a target degree and keep the to-be-measured object after the to-be-measured object is bent to the target degree, wherein the deflection loading device is rotatably connected to the to-be-measured object; two hinged shaft supports which are arranged on the linear guide rails, wherein the hinged shaft supports are symmetrically arranged about a longitudinal center line of the deflection loading device, connected to both ends of the to-be-measured object respectively, and configured to be adjusted obliquely to adapt to the bending of the to-be-measured object to the target degree.

8 Claims, 11 Drawing Sheets

(51) Int. Cl.
*G01N 3/32* (2006.01)
*E21B 47/007* (2012.01)

(58) Field of Classification Search
CPC .......... E21B 47/01; E21B 47/00; E21B 19/22;
E21B 19/15; E21B 7/024; E21B 3/02;
E21B 7/02; E21B 43/127; E21B 7/124;
B23P 19/00; B23P 19/04; G01M 13/003;
G01M 5/005; G01M 13/021; G01M
13/04; G01M 13/00; G01M 13/025;
G01M 17/013; G01M 13/022; G01M
99/007; G01M 17/10; G01M 13/045;
G01M 99/008; B23K 37/00; Y02P 70/10;
Y02E 10/72; G01L 25/003; B23B 39/16
See application file for complete search history.

(56) References Cited

FOREIGN PATENT DOCUMENTS

| | | | | |
|---|---|---|---|---|
| CN | 205333409 U | | 6/2016 | |
| CN | 206038436 U | * | 3/2017 | |
| CN | 207791910 U | | 8/2018 | |
| CN | 110376075 A | | 10/2019 | |
| CN | 111968464 A | | 11/2020 | |
| CN | 112213089 A | * | 1/2021 | ............ G01M 13/00 |
| CN | 112554869 A | | 3/2021 | |
| CN | 112557224 A | | 3/2021 | |
| CN | 112577810 A | | 3/2021 | |
| CN | 112814657 A | | 5/2021 | |
| CN | 112834363 A | | 5/2021 | |
| CN | 114252362 A | * | 3/2022 | |
| JP | S60107545 A | | 6/1985 | |

* cited by examiner

ALTERNATING STRESS FATIGUE TESTING EQUIPMENT

CROSS-REFERENCE TO RELATED APPLICATION

The present application is based on and claims priority of the Chinese Patent Application No. 202110207413.7, filed on Feb. 25, 2021, and from PCT application no. PCT/CN2021/106331 application, filed on Jul. 14, 2021, which is incorporated herein by reference in its entirety

TECHNICAL FIELD

The present application relates to the field of drilling and logging instrument testing technologies, in particular to alternating stress fatigue testing equipment.

BACKGROUND

An intelligent guided drilling system functions as a relatively advanced drilling and logging tool in the petroleum field at present, and when working downhole, has the maximum bending angle of 18°/30 meters, and the maximum rotation speed of 200 r/min. In order to verify the environmental adaptability and reliability, mechanical strength and fatigue life of this system, it is necessary to simulate working conditions of a drilling and logging instrument and a drilling tool in the downhole drilling process in a laboratory environment, then determine whether various indicators of the drilling and logging instrument and the drilling tool (also including an ordinary petroleum drilling and logging instrument) are normal or not by means of detection, and thus determine the performance stability, reliability and service life of the drilling and logging instrument and the drilling tool. An intelligent downhole guided drilling tool is mostly shaped as a slender cylinder, so an instrument under test should be in the shape of a slender cylinder. At present, it is not possible to intuitively and accurately provide alternating stress fatigue testing equipment that simulates working conditions of a while-drilling instrument and a drilling tool in the downhole drilling process.

SUMMARY

The technical problem to be solved by the present application is to overcome the defects in the prior art and provide alternating stress fatigue testing equipment. According to the alternating stress fatigue testing equipment, the middle portion of a to-be-measured object is clamped by a deflection loading device by fixedly connecting two ends of the to-be-measured object respectively to hinged shaft supports. The to-be-measured object is descended to a target position by the deflection loading device in a hydraulically-driven pull-down manner, and then is locked. The to-be-measured object is then driven by a power device to rotate at a set rotation speed. In this way, a working condition of the to-be-measured object in the downhole can be simulated, such that the service life, environmental adaptability and reliability of the to-be-measured object can be determined, thereby achieving the purpose of designing and verifying a drilling and logging instrument through a simulation test.

For this purpose, the adopted technical solution is to provide alternating stress fatigue testing equipment. The alternating stress fatigue testing equipment includes a pedestal on which linear guide rails are arranged; a deflection loading device which is arranged on the pedestal and configured to, in response to a clamped to-be-measured object being driven to slide to a first position, enable the to-be-measured object to be bent to a target degree and keep the to-be-measured object after the to-be-measured object is bent to the target degree, wherein the deflection loading device is rotatably connected to the to-be-measured object; two hinged shaft supports which are arranged on the linear guide rails, wherein the hinged shaft supports are symmetrically arranged about a longitudinal center line of the deflection loading device, connected to two ends of the to-be-measured object respectively, and configured to be adjusted obliquely to adapt to the bending of the to-be-measured object to the target degree; and a power device which is arranged on the linear guide rails, and is in transmission connection with one of the hinged shaft supports, such that the power device can drive the to-be-measured object to rotate.

In an optional embodiment, the deflection loading device includes a supporting mechanism; a loading connection mechanism which is connected to the supporting mechanism and configured to rotatably clamp the to-be-measured object and enable the to-be-measured object to be bent to the target degree in response to the loading connection mechanism sliding to the first position relative to the supporting mechanism; and a first driving mechanism which is connected to the loading connection mechanism and configured to drive the loading connection mechanism to slide relative to the supporting mechanism.

In an optional embodiment, the deflection loading device for stress fatigue testing further includes a locking mechanism which is arranged on the supporting mechanism and configured to limit the loading connection mechanism, such that the loading connection mechanism is kept at the first position relative to the supporting mechanism.

In an optional embodiment, the supporting mechanism is provided with a slideway which is arranged along the height direction of the supporting mechanism; and the loading connection mechanism includes a first slider which is connected to the slideway in a sliding fit manner.

In an optional embodiment, the locking mechanism includes a screw rod locking assembly including a screw rod and a screw nut, wherein the screw rod is arranged in the slideway, and both ends of the screw rod are rotatably connected to the supporting mechanism; the screw nut is cooperatively connected to the screw rod, and moves in the slideway; the first slider is provided with a first hole allowing the screw rod to pass through; when the first driving mechanism drives the loading connection mechanism to move to the first position, the screw rod drives the screw nut to push against the first slider to neutralize an elastic force generated by the bending of the to-be-measured object, such that the loading connection mechanism is kept at the first position relative to the supporting mechanism.

In an optional embodiment, the supporting mechanism includes supporting frames and a first base, wherein the supporting frames are symmetrically arranged, and the bottom end of each supporting frame is connected to the first base; a passage is formed between the supporting frames on both sides; and the loading connection mechanism moves in the passage.

In an optional embodiment, the loading connection mechanism further includes a first bearing seat and a clamping assembly, wherein a first bearing is arranged in the first bearing seat; an outer ring of the first bearing is fixed to the first bearing seat; and the clamping assembly is configured to fix the to-be-measured object passing through an inner ring of the first bearing to the inner ring of the first bearing.

In an optional embodiment, the clamping assembly is configured as an expansion sleeve, and includes an upper expansion sleeve and a lower expansion sleeve which are arranged pairwise, wherein the outer contour of each of the upper expansion sleeve and the lower expansion sleeve is set to be conical, and gradually shrinks along the axis of the to-be-measured object.

In an optional embodiment, a spacer sleeve is arranged between the first bearing and the clamping assembly, an outer diameter of the clamping assembly is matched with an inner hole of the spacer sleeve, and an outer diameter of the spacer sleeve is matched with an inner hole of the first bearing.

In an optional embodiment, the first driving mechanism includes a first oil cylinder, wherein a first mounting flange is arranged on a housing of the first oil cylinder, the first mounting flange is connected to one end of the housing close to a protruding piston rod; the first mounting flange is connected to the side of the first base away from the supporting frames; and a piston rod of the first oil cylinder penetrates upwards out of the first base and is connected to the first bearing seat.

In an optional embodiment, the locking mechanism further includes a first motor, wherein the first motor is in transmission connection with one end of the screw rod away from the first base.

In an optional embodiment, two sides of the first bearing seat are connected to the first slider; a first hole is formed in the first slider, the first hole is a through hole; and the diameter of the first hole is larger than the outer diameter of the screw rod.

In an optional embodiment, the supporting mechanism further includes a cover plate which is connected to the top ends of the supporting frames on both sides; and a baffle is arranged on the bottom surface of the cover plate, and is configured to limit the first bearing seat.

In an optional embodiment, the pedestal includes a bottom beam, a rack and linear guide rails; the rack and the linear guide rails are both connected to the top surface of the bottom beam, and the linear guide rails are arranged on both sides of the bottom beam respectively and symmetrically arranged about the longitudinal center line of the bottom beam; a groove is formed in the middle of the bottom beam; the groove has a trapezoidal cross section with a narrow bottom and a wide top, and extends in the length direction of the bottom beam; and the rack is located between the linear guide rails on both sides, and teeth of the rack face the groove.

In an optional embodiment, the power device includes a driving mechanism; the driving mechanism includes a motor, a speed reducer, a rotating shaft, a third bearing seat and a universal shaft; the motor and the speed reducer are connected by a coupling; the rotating shaft is rotatably connected to the third bearing seat, and both ends of the rotating shaft are exposed out of the third bearing seat; the other end of the speed reducer away from the motor is connected to the rotating shaft; the other end of the rotating shaft is connected to the universal shaft; the other end of the universal shaft away from the third bearing seat is connected to the hinge shaft supports; a sensor is arranged between the speed reducer and the third bearing seat, and configured to detect a torque and a rotation speed output from the speed reducer; the power device further includes a power base which is of a box structure, and the driving mechanism is connected to a top plate of the power base; the power device further includes a walking device, wherein the walking device includes a fourth motor and an output gear; the fourth motor is located inside the box structure; a sealing plate on one side of the box structure is configured to be detachable from the box structure of the power base; and the power base further includes a slider, wherein the top surface of the slider is connected to a bottom plate of the power base, and the slider is connected to the linear guide rails in a sliding fit manner.

In an optional embodiment, each hinged shaft support includes a first bracket mechanism; a rotating mechanism which is rotatably connected to the bracket mechanism; and a connecting shaft which is in transmission connection with the rotating mechanism, wherein one end of the connecting shaft is configured to be fixedly connected to one end of the to-be-measured object; and a rotation axis of the connecting shaft is perpendicular to a rotation axis of the rotating mechanism.

In an optional embodiment, the supporting devices are disposed on both sides of the deflection loading device respectively and also arranged at intervals on the pedestal; each supporting device includes a walking seat; a second supporting device which is arranged on the walking seat, and is telescopic in the direction perpendicular to the walking seat; and a first supporting device which is connected to the second supporting device, wherein the telescopic operation of the second supporting device is used to adjust the distance between the first supporting device and the walking seat, and the first supporting device is configured to support the to-be-measured object.

In an optional embodiment, a hydraulic system includes a hydraulic oil tank which is configured to store oil required by the hydraulic system; a first power system, wherein the input end of the first power system is communicated with the hydraulic oil tank, the first power system includes a first output branch and a second output branch, the first output branch is communicated with a first oil cylinder mechanism of the deflection loading device, such that the first oil cylinder mechanism drives the to-be-measured object clamped by the deflection loading device to be descended to a target position; the second output branch is communicated with a first motor mechanism of the deflection loading device, such that the first motor mechanism locks the to-be-measured object after the to-be-measured object is descended to the target position; a second power system, wherein the input end of the second power system is communicated with the hydraulic oil tank, the second power system includes a third output branch, a fourth output branch, a fifth output branch, and a sixth output branch, the third output branch is communicated with a fourth motor mechanism of the power device, such that the fourth motor mechanism drives the power device to walk along the linear guide rails to a target position, the fourth output branch is communicated with a third motor mechanism of the supporting device, such that the third motor mechanism drives the supporting device to walk along the linear guide rails to a target position, the fifth output branch is communicated with a second oil cylinder mechanism of the supporting device, such that the second oil cylinder mechanism drives supporting rollers of the supporting device to rise to target positions, and the sixth output branch is communicated with a second motor mechanism of each hinged shaft support, such that the second motor mechanism drives the hinged shaft support to walk along the linear guide rails to a target position; and a loop system which is communicated with the first oil cylinder mechanism, the first motor mechanism, the fourth motor mechanism, the third motor mechanism, the second oil cylinder mechanism, and the second motor mechanism, respectively, wherein the output end of the loop system is communicated with the hydraulic oil tank.

In an optional embodiment, the alternating stress fatigue testing equipment includes a lubricating system which is configured to lubricate and cool a rotary bearing, wherein the lubricating system includes: a lubricating oil tank which is configured to store oil required by the hydraulic system, and a temperature sensor is arranged inside the lubricating oil tank, and configured to detect the temperature of lubricating oil in the lubricating oil tank; an oil cooler which is configured to cool the lubricating oil in the lubricating oil tank; and a lubricating oil pump, wherein the input end of the lubricating oil pump is connected to the lubricating oil tank, an integrated block is connected to the output end of the lubricating oil pump, the output end of the integrated block is connected to each bearing seat through a hose, and an oil return opening of each bearing seat is connected to the lubricating oil tank through a hose.

The technical solutions of the present application have the following advantages.

1. The alternating stress fatigue testing equipment provided by the present application implements and simulates the working conditions of alternating stress of instruments and tools under a load by simulating the rotation of the to-be-measured object under bending during a drilling process, and determines the mechanical strength, service life, environmental adaptability and reliability of the to-be-measured object by observing the deformation and stress conditions of the to-be-measured object or by means of auxiliary measurement, thereby achieving the purpose of designing and verifying an drilling and logging instrument through a simulation test.
2. According to the alternating stress fatigue testing equipment provided by the present application, the to-be-measured object is pulled down by means of fully automatic hydraulic loading, and locked in position to ensure the stability of a bending angle test.
3. According to the alternating stress fatigue testing equipment provided by the present application, the to-be-measured object is fixed by the upper and lower expansion sleeves; and in the case that a sufficient clamping force is applied, the to-be-measured object and the expansion sleeves rotate synchronously, which effectively protects the surface of the to-be-measured object from wear or damage.
4. According to the alternating stress fatigue testing equipment provided by the present application, the hinged shaft supports adaptively having vertical tilt angles can adapt to different deflection test conditions.
5. According to the alternating stress fatigue testing equipment provided by the present application, the whole power device and the hinged shaft supports are configured to be automatically movable and be flexibly adjusted in position so as to adapt to to-be-measured objects of different lengths; and the supporting device is also configured to be automatically movable and be flexibly adjusted in position, which can prevent interference with the to-be-measured object during the test, and facilitate the smooth progress of the test.

BRIEF DESCRIPTION OF THE DRAWINGS

To describe the specific embodiments of the present application or the technical solutions in the prior art more clearly, the following briefly introduces the accompanying drawings required for describing the specific embodiments or the descriptions in the prior art. Apparently, the accompanying drawings in the following description show merely some embodiments of the present application, and a person of ordinary skill in the art may still derive other drawings from these accompanying drawings without creative efforts.

Figure 1:
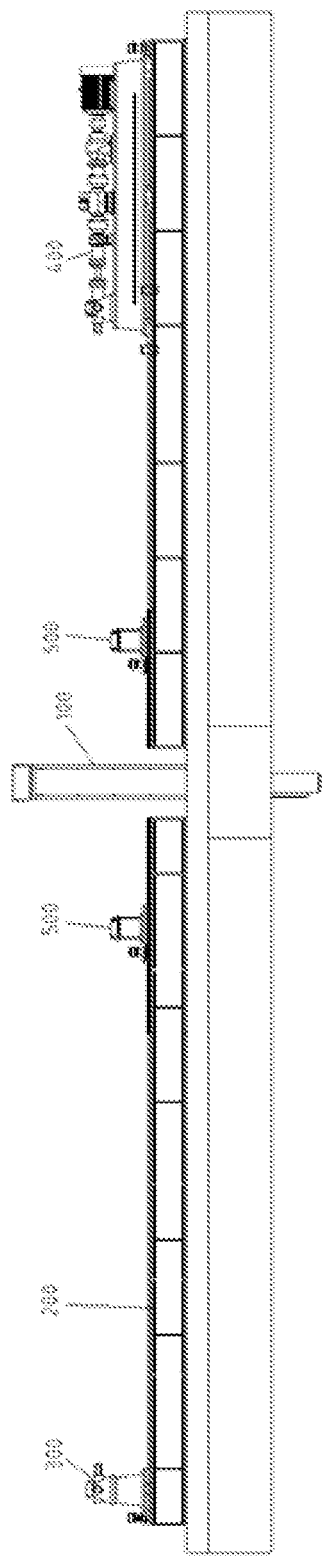
FIG. 1 is a main view of alternating stress fatigue testing equipment provided by the present application.

In the drawings, the respective reference symbols represent the following components respectively:

10—first bearing seat; 11—supporting mechanism; 12—screw rod; 13—first oil cylinder, 14—first base; 15—expansion sleeve; 16—first bearing; 17—screw nut; 18—first motor; 19—slideway; 20—cover plate; 21—connecting shaft; 22—second bearing seat; 23—hinged shaft; 24—first support; 25—shaft sleeve; 26—base box; 27—second motor; 28—first mounting plate; 29—second hole; 30—output gear; 31—second slider; 32—second mounting plate; 33—chock block; 35—supporting roller, 36—second support; 37—first sleeve; 38—second sleeve; 39—third sleeve; 40—first stop block; 41—second stop block; 42—first limiting block; 43—second limiting block; 45—third base; 46—second oil cylinder; 47—third motor, 48—third hole; 50—loop system; 51—hydraulic oil tank; 52—first output branch; 53—second output branch; 54—third output branch; 55—fourth output branch; 56—fifth output branch; 57—sixth output branch; 58—first filter; 59—second filter; 60—first one-way valve; 61—second one-way valve; 62—first motor pump; 63—second motor pump; 64—electric proportional reversing valve; 65—hydraulic control one-way valve; 67—first electromagnetic reversing valve; 70—second electromagnetic reversing valve; 71—third electromagnetic reversing valve; 72—fourth electromagnetic reversing valve; 73—fifth electromagnetic reversing valve; 74—first overflow valve; 75—second overflow valve; 76—first pressure gauge; 77—electric proportional pressure reducing valve; 78—fourth motor; 79—air-cooled radiator, 80—bottom beam; 81—rack; 82—linear guide rail; 83—groove;

84—motor; 85—speed reducer; 86—rotating shaft; 87—third bearing seat; 88—universal shaft; 89—sensor; 90—power base; 91—lubricating oil tank; 92—oil cooler; 93—lubricating oil pump; 94—second pressure gauge; 95—two-way throttle valve; 96—integrated block; 100—deflection loading device; 200—pedestal; 300—hinged shaft support; 400—power device; 500—supporting device; 600—hydraulic system; 700—lubricating system; 102—spacer sleeve; 104—first slider; 105—first hole; 111—supporting frame; 151—upper expansion sleeve; 152—lower expansion sleeve; 181—first motor A; 182—first motor B; 201—baffle; 261—top plate; 262—first bottom plate; 263—upright plate; and 264—sealing plate.

DETAILED DESCRIPTION

In order to make the purpose, technical solutions, and advantages of the embodiments of the present application clearer, the technical solutions of the embodiments of the present application will be clearly and completely described below in conjunction with the accompanying drawings in the embodiments of the present application. Of course, the described embodiments are merely some embodiments, rather than all embodiments, of the present application. Based on the described embodiments of the present application, all other embodiments derived by a person of ordinary skill in the art without creative efforts shall fall within the protection scope of the present application.

The technical and scientific terms as used in the present application should have the meanings as commonly understood by a person of ordinary skill in the art of the present application, unless otherwise defined. The terms "first", "second" and similar terms used in the present application do not denote any order, quantity, or importance, and are merely used to distinguish different components. The term "comprise/include", "containing" or similar terms mean that elements or objects appearing before the term cover the listed elements or objects and its equivalents appearing after the term while other elements or objects are not excluded. The term "connected" or "coupled" and similar terms are not limited to physical or mechanical connections, and may include electrical connection, and the connection may be direct or indirect. The terms "upper", "lower", "left", "right" and the like are only used to indicate the relative positional relationship, and when the absolute position of a described object changes, the relative positional relationship may also change accordingly.

In order to keep the following description of the embodiments of the present application clear and concise, detailed descriptions of known functions and known components are omitted in the present application.

As shown in FIGS. 1 to 17, an embodiment of the present application provides alternating stress fatigue testing equipment. The alternating stress fatigue testing equipment includes a pedestal 200 on which linear guide rails are arranged; a deflection loading device 100 which is arranged on the pedestal and configured to, in response to a clamped to-be-measured object being driven to slide to a first position, enable the to-be-measured object to be bent to a target degree and keep the to-be-measured object after the to-be-measured object is bent to the target degree, wherein the deflection loading device 100 is rotatably connected to the to-be-measured object; two hinged shaft supports 300 which are arranged on the linear guide rails, wherein the hinged shaft supports 300 are symmetrically arranged about the longitudinal center line of the deflection loading device 100, connected to both ends of the to-be-measured object respectively, and configured to be adjusted obliquely so as to adapt to the bending of the to-be-measured object to the target degree; and a power device 400 which is arranged on the linear guide rails, and is in transmission connection with one of the hinged shaft supports 300, such that the power device 400 can drive the to-be-measured object to rotate. According to the alternating stress fatigue testing equipment, since the to-be-measured object is in the shape of a slender cylinder, in order to simulate the deflection of the bending deformation of the to-be-measured object during the downhole operation, both ends of the to-be-measured object may be fixedly connected to connecting shafts of the hinged shaft supports 300 respectively. The middle portion of the to-be-measured object is clamped by the deflection loading device 100. The to-be-measured object is descended by the deflection loading device 100 to a target position in a hydraulically-driven pull-down manner, and then is locked. The to-be-measured object is then driven by the power device 400 via a variable frequency motor. The to-be-measured object is driven to rotate at a set rotation speed through a speed reducer and the hinged shaft supports, and then, the equipment is stopped when a set test time is reached. Subsequently, whether various indicators of the to-be-measured object are normal or not is determined by means of detection, so as to judge the service life, environmental adaptability and reliability of the to-be-measured object, thereby achieving the purpose of designing and verifying a drilling and logging instrument through a simulation test.

The to-be-measured object in the present application is in the shape of a column. For example, the to-be-measured object includes a drilling tool such as an intelligent guide drill.

Figure 7:
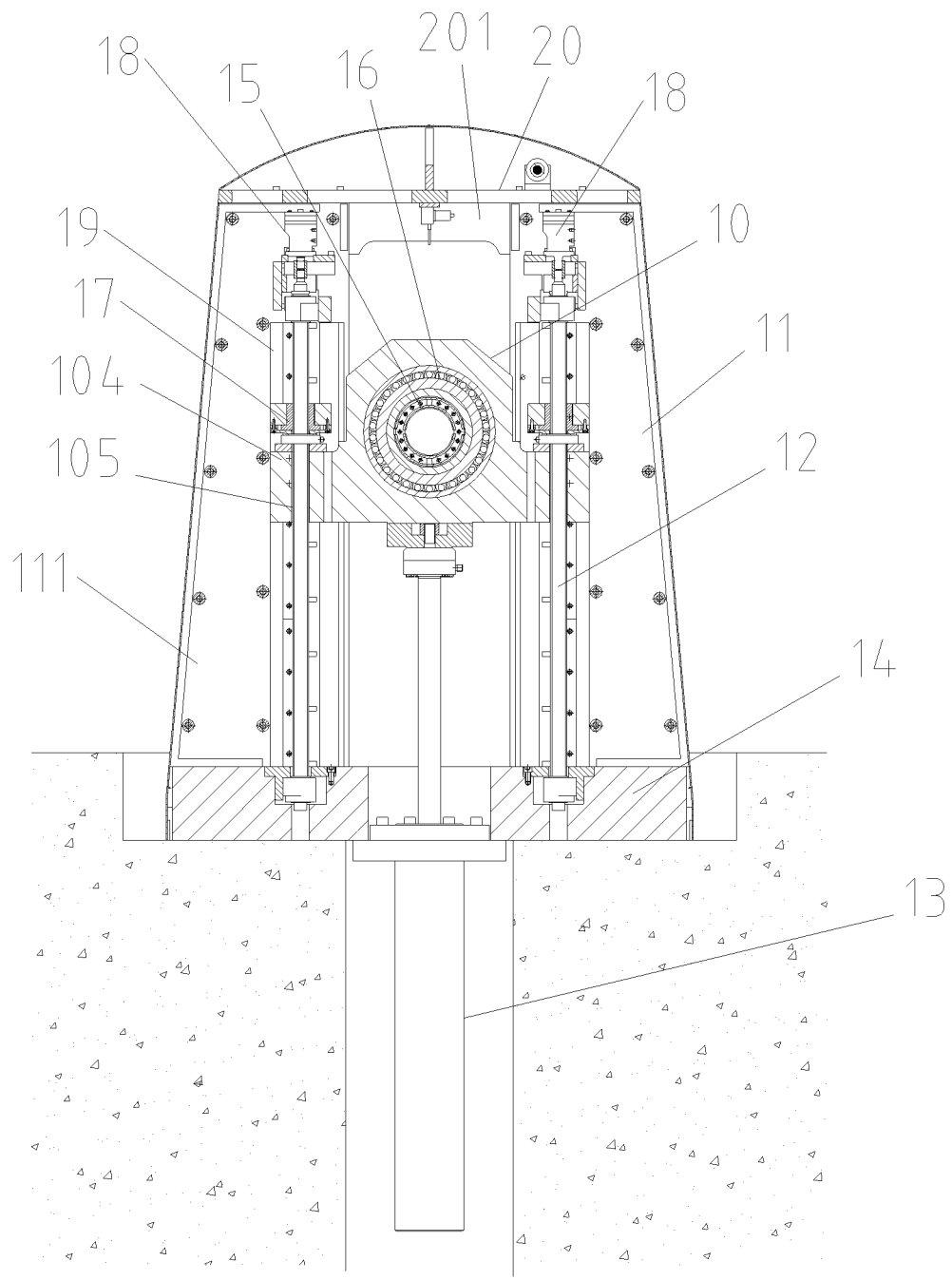
FIG. 7 is a schematic diagram of a design structure of a deflection loading device.
Figure 8:
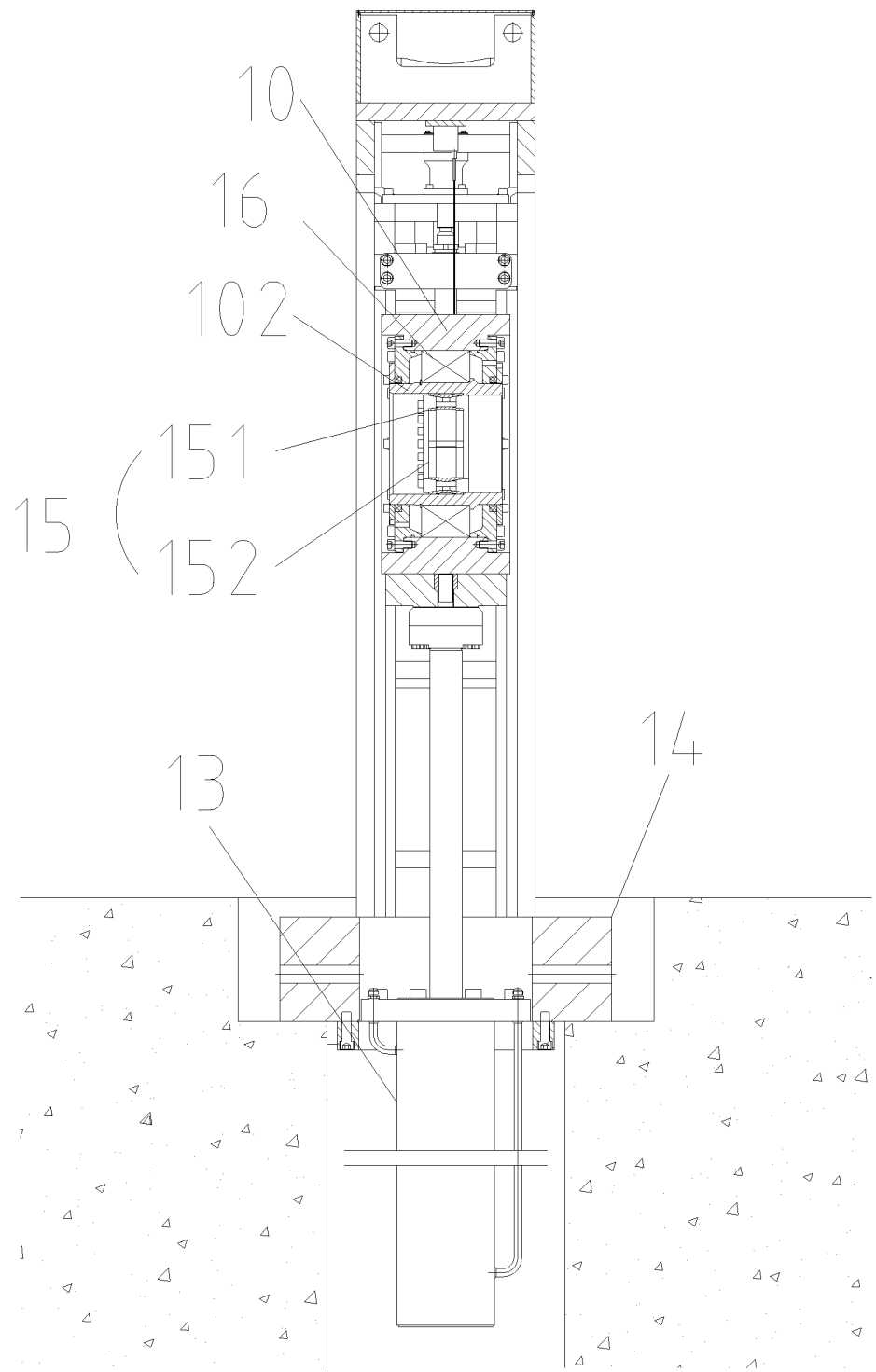
FIG. 8 is a longitudinal sectional view of the deflection loading device shown in FIG. 7.

As shown in FIGS. 7 to 8, an embodiment of the present application provides a loading connection mechanism 100. The loading connection mechanism 100 includes a supporting mechanism 11; a loading connection mechanism which is connected to the supporting mechanism 11 and configured to rotatably clamp the to-be-measured object, and while driving the loading connection mechanism to slide to a first position relative to the supporting mechanism, enable the to-be-measured object to be bent to a target degree; and a first driving mechanism which is connected to the loading connection mechanism and configured to drive the loading connection mechanism to slide relative to the supporting mechanism. The first driving mechanism may be in a motor-driven screw drive form, a motor drive form or a cylinder drive form, etc., which is not excessively limited herein. The first driving mechanism, while driving the loading connection mechanism to slide to the first position relative to the supporting mechanism, enables the to-be-measured object to be bent to the target degree, that is, a bending angle is formed.

The deflection loading device further includes a locking mechanism which is arranged on the supporting mechanism 11 and which is configured to limit the loading connection mechanism, such that the loading connection mechanism is kept at the first position relative to the supporting mechanism.

In some embodiments, the supporting mechanism 11 is provided with a slideway 19 which is arranged along the height direction of the supporting mechanism 11. The loading connection mechanism includes a first slider 104 which is connected to the slideway 19 in a sliding fit manner. Guided by the slideway 19, a first bearing seat 10 can move vertically more steadily, and the deviation in the rotation of the first bearing seat 10, which affects an experimental effect, caused by the vibration in the test process can further be avoided.

In an exemplary embodiment, the locking mechanism includes a screw rod locking assembly. The screw rod locking assembly includes a screw rod 12 and a screw nut 17, wherein the screw rod 12 is arranged in the slideway, and both ends of the screw rod 12 are rotatably connected to the supporting mechanism 11. The screw nut 17 is cooperatively connected to the screw rod 12, and moves in the slideway. The first slider 104 is provided with a first hole 105 configured to allow the screw rod 12 to pass through. When the first driving mechanism drives the loading connection mechanism to move to the first position, the screw rod drives the screw nut 17 to push against the first slider to neutralize an elastic force generated by the bending of the to-be-measured object, such that the loading connection mechanism is kept at the first position relative to the supporting mechanism 11.

The first driving mechanism includes a first oil cylinder 13. A first mounting flange is arranged on a housing of the first oil cylinder 13, and is connected to one end of the housing close to the protruding piston rod. The first mounting flange is connected to the side of the first base 14 away from supporting frames 111. A piston rod of the first oil cylinder 13 penetrates upward out of the first base 14 and is connected to the first bearing seat 10. In order to test the reliability of the entire deflection loading device under stress, the first base 14 may be firmly fixed to a concrete foundation by anchor bolts. The first base 14 may be provided with a hole through which a protruding end of the first oil cylinder 13 penetrates upward. The concrete foundation may also be provided with a hole in which a cylinder body of the first oil cylinder 13 may be located. A mounting flange of the first oil cylinder 13 and the bottom surface of the first base 14 are connected by bolts.

The piston rod of the first oil cylinder 13 slowly extends to push the first bearing seat 10 to move upward; and guided by the screw rod 12, the piston rod of the first oil cylinder 13 can move vertically more stable. After the first bearing seat 10 is adjusted to a suitable position by moving vertically, a first motor 18 is started to drive the screw rod 12 to rotate, such that the screw nut 17 moves downward along the screw rod 12 until the screw nut 17 pushes against the first slider 104. In order to ensure a positioning effect, the to-be-measured object is kept at a certain bending angle by means of self-locking positioning of double screw rods and screw nuts. Thus, an adverse effect on a bending angle caused by the failure in pressure maintenance of the first motor arising from the vibration during the test is avoided, and accordingly, an experimental effect is free of influence.

The supporting mechanism 11 includes supporting frames 11 and a first base 14, wherein the supporting frames 111 are symmetrically arranged, and the bottom end of each supporting frame 111 is connected to the first base 14. A passage is formed between the supporting frames 111 on both sides. The loading connection mechanism moves in the passage. The supporting frames 111 may be separately arranged on both sides of the first base 14. The first bearing seat 10 is located between the supporting frames 111, which can cause the entire deflection loading device under stress to be stressed more uniformly and more reasonably.

When the to-be-measured object is rotating, if the surface of the to-be-measured object generates a sliding force, a friction, etc., it is highly likely to cause the to-be-measured object to be worn or even scrapped. In view of this problem, the inventor of the present application also makes the following designs.

The loading connection mechanism further includes a first bearing seat 10 and a clamping assembly, wherein a first bearing 16 is arranged in the first bearing seat 10. An outer ring of the first bearing 16 is fixed to the first bearing seat 10. The clamping assembly is configured to fix the to-be-measured object passing through an inner ring of the first bearing 16 with an inner ring of the first bearing 16.

Due to a large length of the to-be-measured object, in order to install and remove the to-be-measured object more conveniently, in an optional embodiment, the clamping assembly is configured as an expansion sleeve. The clamping assembly includes an upper expansion sleeve 151 and a lower expansion sleeve 152 which are arranged pairwise, wherein an outer contour of each of the upper expansion sleeve 151 and the lower expansion sleeve 152 is set to be conical, and gradually shrinks along the axis of the to-be-measured object.

A spacer sleeve 102 is arranged between the first bearing 16 and the clamping assembly, wherein the outer diameter of the clamping assembly is matched with an inner hole of the spacer sleeve 102, and an outer diameter of the spacer sleeve 102 is matched with an inner hole of the first bearing 16.

By means of a high-strength tension bolt, a huge holding force is generated between an inner ring of the expansion sleeve 15 and the to-be-measured object, and between an outer ring of the expansion sleeve 15 and the spacer sleeve 102, thereby realizing the keyless coupling between the expansion sleeve 15 and the to-be-measured object. The expansion sleeve 15 under a load can transfer a torque, an axial force or a combined load of the torque and the axial force. Therefore, the design of the expansion sleeve 15 makes a clamping method of the to-be-measured object more reliable, and can prevent any friction and damage on the surface of the to-be-measured object. The outer contour of the spacer sleeve 102 is in interference fit with the first bearing 16, and a shaft stop is arranged on the spacer sleeve 102 to axially limit the inner ring of the first bearing 16. An end cover may also be arranged on each of two ends of the first bearing seat 10 to axially limit an outer ring of the first bearing 16. The first bearing 16, the spacer sleeve 102 and the end covers are sequentially installed in the first bearing seat 10 first. The to-be-measured object passes through the inner hole of the spacer sleeve 102. At this time, the upper expansion sleeve 151 and the lower expansion sleeve 152 are inserted into the spacer sleeve 102 along the outer surface of the to-be-measured object. The upper expansion sleeve 151 and the lower expansion sleeve 152 are continuously pushed inward by tightening the high-strength tension bolt. Since the outer contour of each of the upper expansion sleeve 151 and the lower expansion sleeve 152 gradually shrinks along the axis of the to-be-measured object, the to-be-measured object is clamped. In addition, a load can be effectively transferred through the expansion sleeve 15, and the surface of the to-be-measured object can be free from any friction and damage.

Both sides of the first bearing seat 10 are connected to the first slider 104. A first hole 105 is formed in the first slider. The first hole 105 is a through hole, and the inner diameter of the first hole 105 is larger than the outer diameter of the screw rod 12.

The locking mechanism further includes a first motor 18, wherein the first motor 18 is in transmission connection with one end of the screw rod 12 away from the first base. The first motor 18 may be a hydraulic motor. The first motor 18 drives the screw rod 12 to rotate, such that the screw nut 17 moves vertically along the screw rod 12.

A cover plate 20 is arranged on the top ends of the supporting frames 111, and connected to the supporting frames 111 that are arranged on both sides respectively. A baffle 201 is arranged on the bottom surface of the cover 20, and configured to limit the first bearing seat 10. The supporting frames 111 on both sides can be connected as a whole through the cover plate 20. The baffle 201 may be perpendicular to the cover plate 20. The top surface of the cover plate 20 may be provided with stiffeners, wherein the stiffeners may also be perpendicular to the cover plate 20, and can correspond to the baffle 201 in position oppositely. In this way, the supporting mechanism 11 is more reliable in the experimental process. The baffle 201 may be configured to prevent the first bearing seat 10 from damaging a screw rod assembly such as a locking nut due to improper operations in the rising process.

A working principle of the deflection loading device is as follows. The first oil cylinder is driven by high-pressure hydraulic oil of the hydraulic system to pull down the first bearing seat, while the expansion sleeve is arranged inside the first bearing seat to fix the first bearing seat and the to-be-measured object together, such that the to-be-measured object can be bent by moving downward along with the first bearing seat, thereby achieving a function of simulating a bottom hole bending condition. When a set bending angle is reached, the screw rod locking assembly is driven by the first hydraulic motor to drive the screw nut to move downward with the rotation of the screw rod until it reaches a first slider position of the first bearing seat and pushes against the first slider. In this way, the bending angle is locked through a self-locking function of the screw rod and the screw nut, which can neutralize an elastic force generated by the bending of the to-be-measured object and ensure the reliability of the bending angle during the test.

Figure 2:
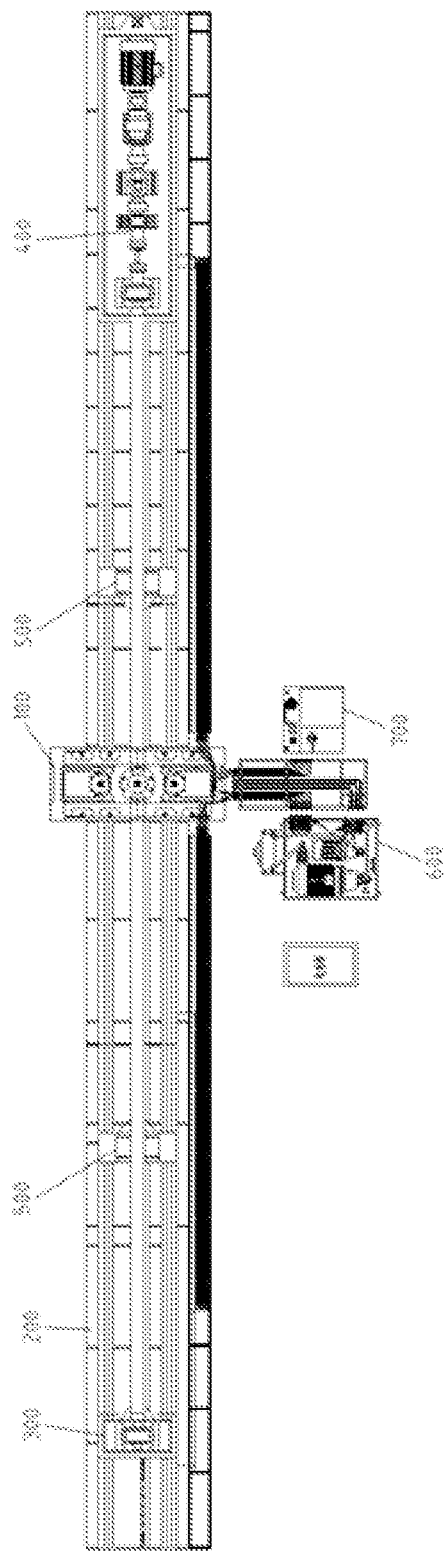
FIG. 2 is a top view of the alternating stress fatigue testing equipment shown in FIG. 1.
Figure 3:
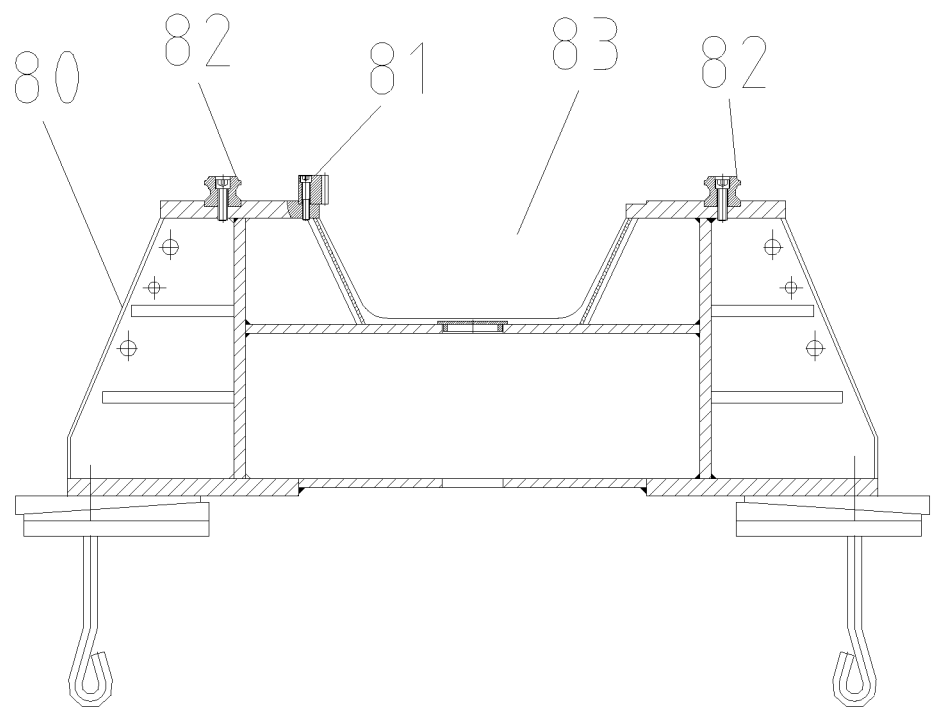
FIG. 3 is a cross-sectional view of a pedestal.

As shown in FIGS. 1 to 3, the pedestal 200 includes a bottom beam 80, a rack 81 and linear guide rails 82. The rack 81 and the linear guide rails are both connected to the top surface of the bottom beam 80, and the linear guide rails 82 are disposed on both sides of the bottom beam 80 respectively and symmetrically arranged about the longitudinal center line of the bottom beam 80. A groove 83 is formed in the middle of the bottom beam 80. The groove 83 has a trapezoidal cross section with the narrow bottom and the wide top, and extends in the length direction of the bottom beam 80. The rack 81 is located between the linear guide rails 82 on both sides, and teeth of the rack 81 face the groove 83. In some embodiments of the present application, the pedestal 200 may be divided into four sections. Two sections of 8.1-meter bottom beams are arranged at the right end of the deflection loading device, and two sections of 7-meter bottom beams are arranged at the left end of the deflection loading device. The linear guide rails 82 are arranged on both sides of the bottom beam 80 respectively, and can effectively support the hinged shaft supports, the supporting device and the power device 400 through cooperation with the slider. The bottom beam 80 may be made of a steel plate by welding, with the groove 83 reserved in the middle to provide a space for the to-be-measured object to be bent. The bottom beam 80 is fixed to the concrete foundation with adjustable pad irons and foundation bolts, which facilitates the leveling and fixation of the bottom beam 80 and ensures the overall bearing strength.

A fixed limiting block is arranged on each of both ends of the base to prevent the hinged shaft supports and the power device 400 from escaping from the linear guide rails. In addition, the base is equipped with four U-shaped clamping blocks to fix the power device 400 and the hinged shaft supports, thereby preventing them from being disconnected due to the movement in the bending and rotating process.

Figure 4:
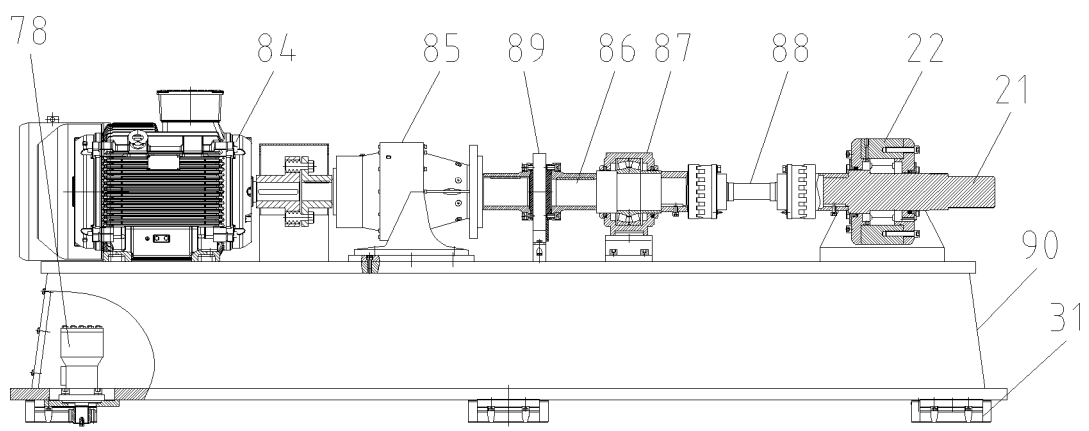
FIG. 4 is a main view of a power device.
Figure 5:
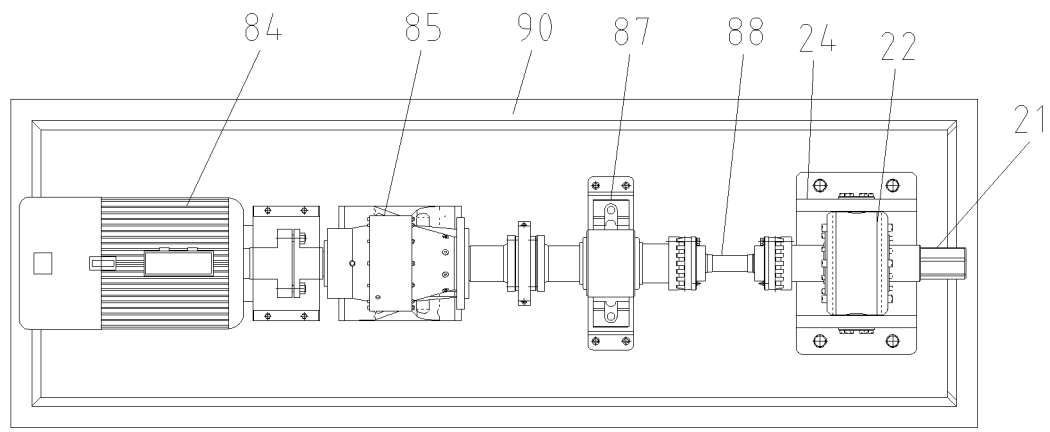
FIG. 5 is a top view of the power device shown in FIG. 4.
Figure 6:
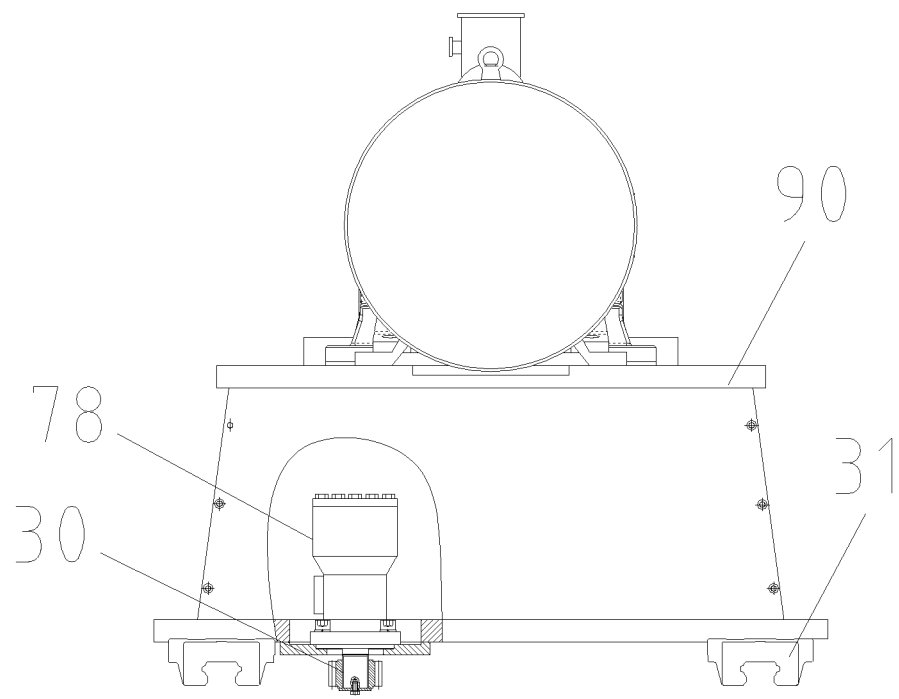
FIG. 6 is a left view of the power device shown in FIG. 4.

As shown in FIGS. 4 to 6, the power device 400 includes a rotary driving mechanism. The rotary driving mechanism includes a motor 84, a speed reducer 85, a rotating shaft 86, a third bearing seat 87 and a universal shaft 88. The motor 84 and the speed reducer 85 are connected by a coupling. The rotating shaft 86 is rotatably connected to the third bearing seat 87, and both ends of the rotating shaft 86 are exposed out of the third bearing seat 87. The other end of the speed reducer 85 away from the motor is connected to the rotating shaft 86, the other end of the rotating shaft 86 is connected to the universal shaft 88, and the other end of the universal shaft away from the third bearing seat 87 is connected to the hinge shaft supports 300. A sensor 89 is arranged between the speed reducer 85 and the third bearing seat, and configured to detect a torque and a rotation speed output from the speed reducer 85. The power device 400 further includes a power base 90 which is of a box structure. The rotary driving mechanism is connected to a top plate of the power base 90. The power device 400 further includes a walking device. The walking device includes a fourth motor 78 and an output gear 30. The fourth motor 78 is located inside the box structure. A sealing plate on one side of the box structure is configured to be detachable from the box structure of the power base. An output shaft of the fourth motor 78 penetrates downward out of a bottom plate of the power base. The output gear 30 is connected to the output shaft of the fourth motor 78. The power base further includes a slider 31, wherein the top surface of the slider 31 is connected to the bottom plate of the power base 90, and the slider 31 is connected to the linear guide rails 82 in a sliding fit manner. The motor 84 may be a variable frequency motor. The power of the motor 84 may be transmitted to the speed reducer 85 through the coupling. After the motor 84 is decelerated by the speed reducer 85, the power is transmitted to the hinged shaft supports through the universal shaft. The hinged shaft supports are connected to the to-be-measured object to transmit the torque and rotation speed. The torque and the rotation speed can be measured through the sensor 89. The sensor 89 measures the torque and rotation speed by using an electromagnetic induction measurement method to provide data signals for a measurement and control system. The torque data may provide more data references for the test. The motor 84, the speed reducer 85 and the third bearing seat 87 may be installed and fixed on the top plate of the power base 90 through bolts. In addition, the hinged shaft supports connected to the power device may also be directly installed and fixed on the top plate of the power base 90. That is, the second bearing seat 22 may be directly installed and fixed on the top plate of the power base 90. The fourth motor 78 drives the output gear 30, and the output gear 30 meshes with the rack on the pedestal, which facilitates adjustment of the position of the power device to adapt to the to-be-measured objects of different lengths for testing.

Figure 9:
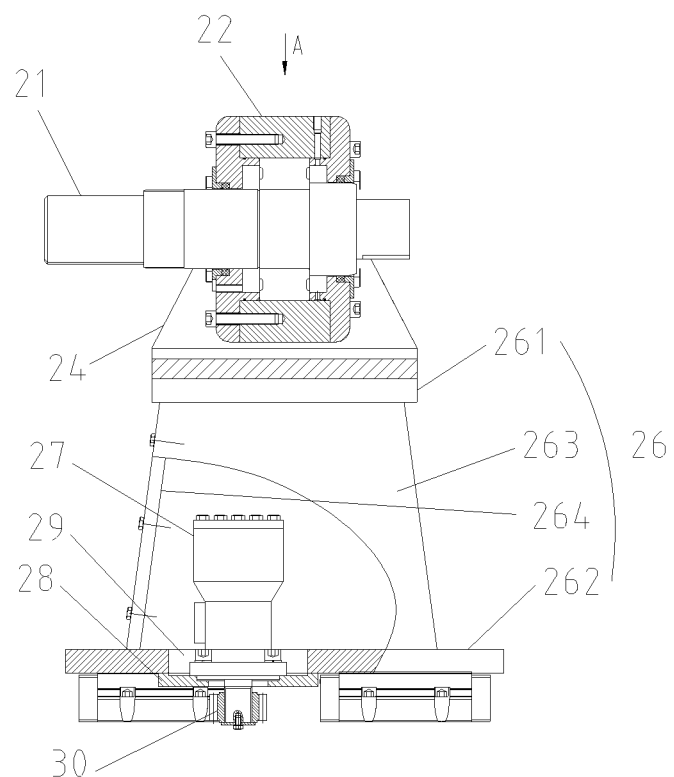
FIG. 9 is a schematic diagram of a design structure of hinged shaft supports.
Figure 10:
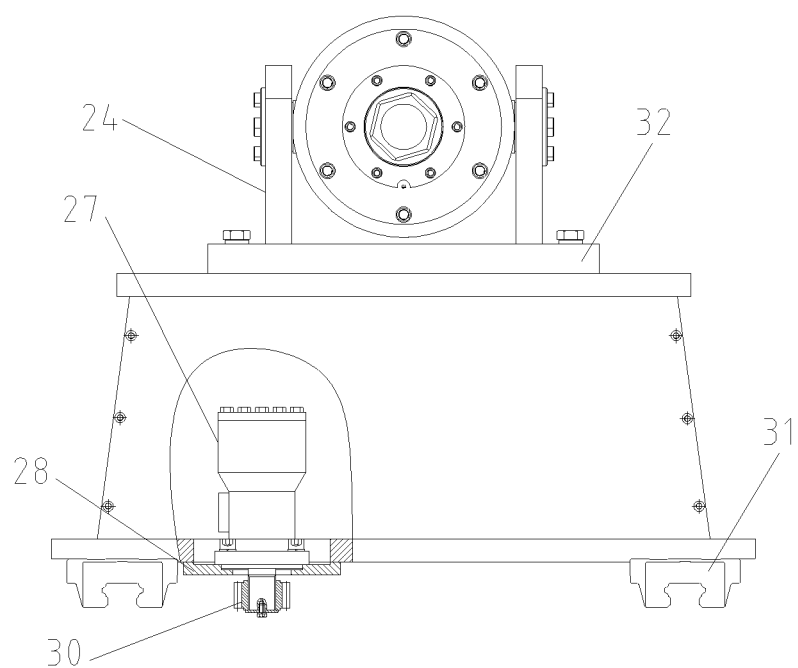
FIG. 10 is a left view of the hinged shaft supports shown in FIG. 9.
Figure 11:
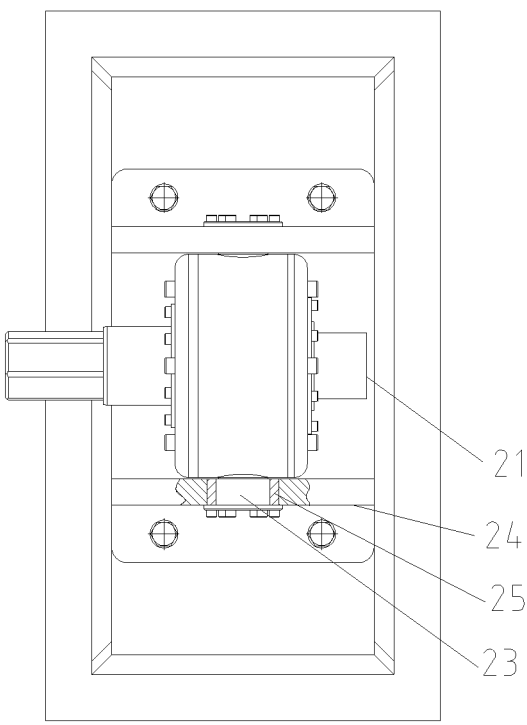
FIG. 11 is a top view of the hinged shaft supports shown in FIG. 9.

As shown in FIGS. 9 to 11, an embodiment of the present application provides a hinged shaft support 300. The hinged shaft support 300 includes a first bracket mechanism; a rotating mechanism which is rotatably connected to the bracket mechanism; and a connecting shaft 21 which is in transmission connection with the rotating mechanism, wherein one end of the connecting shaft 21 is configured to be fixedly connected to one end of the to-be-measured object, and the rotation axis of the connecting shaft 21 is perpendicular to the rotation axis of the rotating mechanism.

The rotating mechanism includes hinged shafts 23, a second bearing seat 22 and a second bearing arranged on the second bearing seat 22, wherein the connecting shaft 21 passes through an inner ring of the second bearing and is fixedly connected to the inner ring of the second bearing. The outer side of the second bearing seat 22 is connected to the hinge shafts 23. The hinged shafts 23 are symmetrically arranged, and rotatably connected to the first bracket mechanism.

Since the to-be-measured object is in the shape of a slender rod, the rotation torque and rotation speed output from the power device can be transmitted to the to-be-measured object through the connecting shaft 21. In order to realize the effective support and rotating connection of the second bearing seat 22 to the connecting shaft 21, a bearing may be arranged in the second bearing seat 22. The bearing may be preferably a double-row deep groove ball bearing, which can meet the design requirements for rotation torque and rotation speed, and can reduce a rotation resistance. An end cover may be arranged on each of both sides of the second bearing seat 22 to axially limit an outer ring of the bearing. In addition, a shaft stop may be arranged on the connecting shaft 21 to axially limit the connecting shaft 21. The hinged shafts 23 are symmetrically arranged about the longitudinal center line of the second bearing seat 22 and the axis of each hinged shaft 23 is perpendicular to the axis of the connecting shaft 21, such that the connecting shaft 21 can be adjusted obliquely in the vertical direction. When tested, the to-be-measured object is bent downward to drive the connecting shaft 21 to tilt downward so as to automatically adjust an angle. In this way, the abnormal stress concentration at the connecting ends of the to-be-measured object and the connecting shaft can be reduced, thereby avoiding affecting the test effect of the entire testing equipment.

The first bracket mechanism includes first supports 24 and a second mounting plate 32, wherein the bottom surface of each first support 24 is connected to the second mounting plate 32, and the first supports 24 are symmetrically arranged. A passage is formed between the first supports 24 on both sides, wherein the rotating mechanism is located in the passage, and each hinged shaft 23 is rotatably connected to the corresponding first support 24. The first supports 24 and the second mounting plate 32 may be welded firmly, and the second mounting plate 32 and the top plate 261 may be detachably connected by bolts.

A shaft sleeve 25 is arranged between each first support 24 and the corresponding hinged shaft 23, wherein an inner hole of the shaft sleeve 25 is matched with the hinged shaft 23. Each first support 24 includes an upper clamping block and a lower clamping block, wherein the upper clamping block is provided with upper semicircular holes, and the lower clamping block is provided with lower semicircular holes. The upper semicircular holes and the lower semicircular holes are arranged in pairs respectively, and are matched with an outer diameter of the shaft sleeve 25. The design of the shaft sleeve 25 can reduce the friction of the hinged shafts and facilitate the angle adjustment of the connecting shaft 21. The shaft sleeve 25 may be preferably a copper sleeve. In order to facilitate the assembly and disassembly of the second bearing seat 22, each first support 24 is provided with the upper clamping block and the lower clamping block, which are locked by a bolt to clamp the shaft sleeve 25.

Each hinged shaft support for stress fatigue test further includes a second base. The second base includes a base box 26. The base box 26 includes a top plate 261, a first bottom plate 262, upright plates 263 and sealing plates 264. The top and bottom surfaces of the upright plates 263 and the sealing plates 264 are respectively connected to the top plate 261 and the first bottom plate 262, and each upright plate 263 is parallel to the axis of the connecting shaft 21. The upright plates 263 are separately disposed on both sides of the top plate 261 and the first bottom plate 262 and arranged symmetrically, and each sealing plate 264 is connected to two sides of the upright plate 263. The top plate 261, the first bottom plate 262, the two upright plates 263 and the two sealing plates 264 may define a closed box. In this way, the base box 26 can withstand complex stresses in a plurality of directions, thereby realizing effective support for the connecting shaft 21, and ensuring the smooth progress of the test.

Each hinged shaft support for stress fatigue test further includes a walking device. The walking device includes a second motor 27 and an output gear 30, wherein the second motor 27 is located inside the base box 26. The first bottom plate 262 is provided with a first through hole 29. A first mounting plate 28 is arranged on the bottom surface of the first bottom plate 262, and is connected to the bottom surface of the first bottom plate 262. A mounting flange of the second motor 27 is embedded in the first hole 29, and is connected to the top surface of the first mounting plate 28. The second motor 27 penetrates out of the first hole 29 and extends upward, and the output shaft of the second motor 27 penetrates out of the first mounting plate 28 and extends downward. The output gear 30 is connected to the output shaft of the second motor 27. The second motor 27 may be configured as a cycloid motor. The second motor 27 drives the output gear 30. The output gear 30 meshes with the rack on the pedestal, such that the positions of the hinged shaft supports provided in the present application can be adjusted to adapt to the to-be-measured objects of different lengths for testing.

The sealing plate 264 on one side may be configured to be detachable from the base box 26. The bottom surface of the second mounting plate 32 is connected to the top surface of the top plate 261. The sealing plates 264 may be connected to the upright plates 263 on both sides by means of bolts, such that the overhaul and routine maintenance of the second motor 27 can be implemented by disassembling the sealing plates 264.

The second base further includes a second slider 31, wherein the top surface of the second slider 31 is connected to the bottom surface of the first bottom plate 262, and the second slider 31 is connected to the linear guide rails in a sliding fit manner. The second slider 31 moves along the linear guide rails, and under the guidance of the linear guide rails, the hinged shaft supports provided in the present application are adjusted conveniently to appropriate positions on the pedestal; and in addition, effective support can be provided to the hinged shaft supports in the present application through the linear guide rails.

In order to transmit torque better, in an optional embodiment, a cross section of the other end of the connecting shaft 21 away from the power device is set to be square. The square cross section is more conducive and convenient for the assembly and disassembly of the to-be-measured object during testing. The connecting shaft 21 and the to-be-measured object may be connected through a connecting sleeve. A square hole may be formed in the connecting sleeve, wherein the square end of the connecting shaft 21 is inserted into the square hole, and a bolt is tightened into the connecting sleeve. Meanwhile, a screw is tightened into the connecting sleeve in the radial direction to press against the connecting shaft 21, thereby realizing the axial positioning of the connecting shaft 21.

A power device for alternating stress fatigue testing according to an embodiment of the present application includes a rotary driving mechanism, a universal shaft, and hinged shaft supports for stress fatigue testing, wherein one end of the universal shaft is in transmission connection with an output shaft of the rotary driving mechanism, and the other end of the universal shaft is in transmission connection with the connecting shaft.

Figure 12:
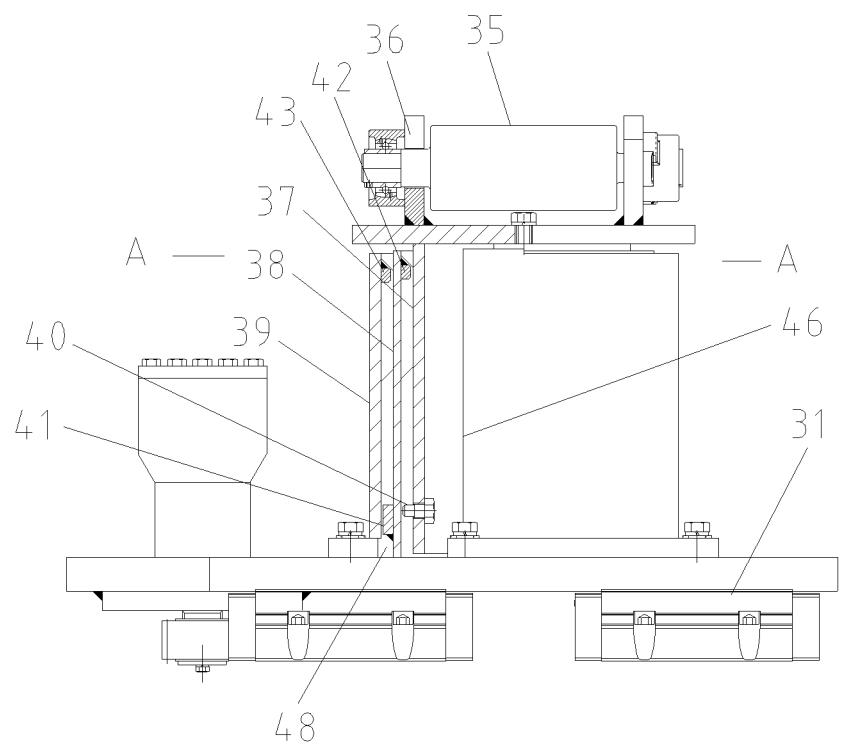
FIG. 12 is a schematic diagram of a design structure of a supporting device.
Figure 13:
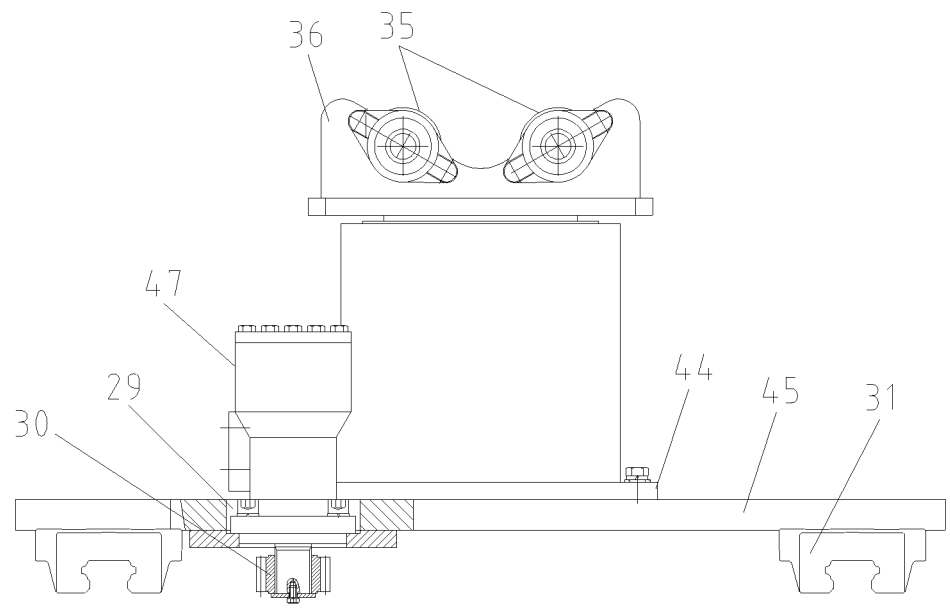
FIG. 13 is a left view of the supporting device shown in FIG. 12.
Figure 14:
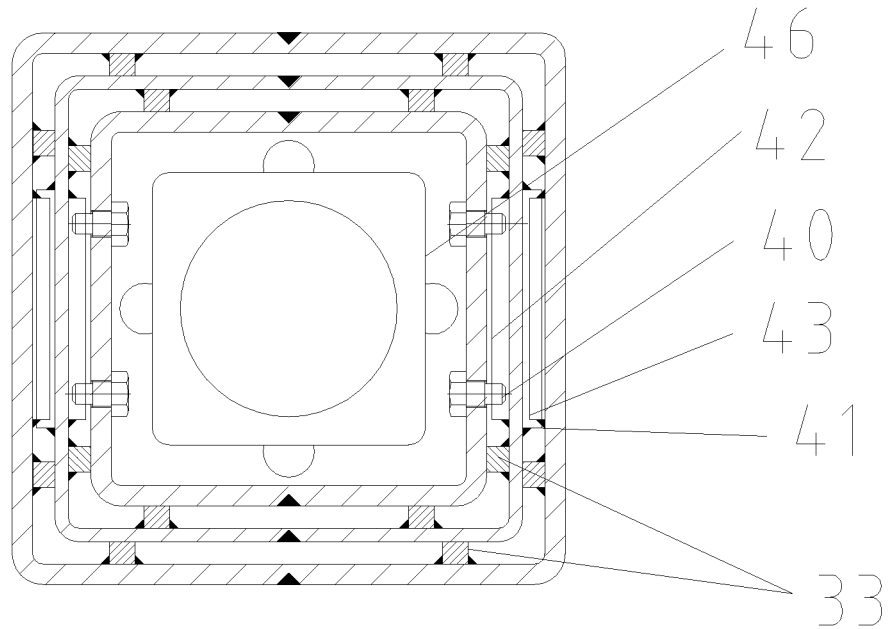
FIG. 14 is a sectional view taken along A-A in FIG. 12.

As shown in FIGS. 12 to 14, an embodiment of the present application provides a supporting device 500. The supporting device 500 includes a walking seat; a second supporting device which is arranged on the walking seat, and is telescopic in a direction perpendicular to the walking seat; and a first supporting device which is connected to the second supporting device, wherein the telescopic operation of the second supporting device is used to adjust the distance between the first supporting device and the walking seat, and the first supporting device is configured to support the to-be-measured object. Since the to-be-measured object is in the shape of a slender rod, two supporting devices provided in the present application can be separately arranged on the pedestal of the testing equipment. Before the to-be-measured object is installed on the testing equipment, the first supporting device is raised to support the to-be-measured object, so as to facilitate the assembly and connection between the to-be-measured object and the hinged shaft supports.

The first supporting device includes supporting rollers 35 and a second bracket mechanism, wherein the supporting rollers 35 are configured to support the to-be-measured object. The supporting rollers 35 are symmetrically arranged, and are rotatably connected to the second bracket mechanism. A passage that gradually shrinks from top to bottom and allows the to-be-measured object to pass through is formed between the supporting rollers on both sides, and the axis of each supporting roller 35 is parallel to the axis of the to-be-measured object. Each supporting roller 35 includes a roller body. The distance between outer diameters of the roller bodies on both sides is smaller than the outer diameter of the to-be-measured object.

The second bracket mechanism includes second supports 36 and a third bottom plate, wherein the second supports 36 are symmetrically arranged, and the bottom surface of each second support 36 is connected to the third bottom plate. Each supporting roller 35 further includes third bearing seats, wherein the rotating shafts on both ends of each roller body are rotatably connected to one of the third bearing seats, respectively. The two third bearing seats of the supporting roller 35 are respectively arranged on the outer side of the second support 36, and are detachably connected with the second support 36. The second support 36 is provided with a concave arc and mounting holes, wherein each mounting hole is U-shaped, and an opening of the mounting hole is communicated with the top end of the second support 36. Each mounting hole is matched with the corresponding rotating shaft. The mounting holes are symmetrically arranged, and the are is located between the mounting holes on both sides. In some embodiments of the present application, the third bearing seats may be first assembled well with the rotating shafts on both ends of the roller body. A bearing may be arranged in each third bearing seat. The supporting rollers 35 are then placed in the mounting hole from top to bottom. The axial distance between the third bearing seats is adjusted appropriately. In this case, the third bearing seats are fixedly connected to the outer side of the second support 36 by means of bolts, such that the assembly and installation process is simple and easy to operate.

In some embodiments of the present application, the axis of each supporting roller 35 is set to be parallel to the axis of the to-be-measured object. Since the supporting rollers 35 are arranged on both sides of the second support 36 respectively and arranged symmetrically, and an outer circle of the roller body of each supporting roller 35 is tangent to an outer circle of the to-be-measured object, the center of gravity of the to-be-measured object faces downward, and a tangent point between the outer circle of the to-be-measured object and the outer circle of the supporting roller 35 is taken as a supporting point. Therefore, the center of gravity of the to-be-measured object and the two supporting points form a stable triangular supporting structure. In this way, the supporting rollers 35 can reliably support the to-be-measured object. When the to-be-measured object needs to be installed on the testing equipment, the first supporting device can be raised upward through the second supporting device, and then the to-be-measured object is placed on the supporting rollers 35. In order to reduce the impact of the to-be-measured object on the supporting rollers 35, two ends of each supporting roller 35 can be rotatably connected to the second support 36. That is, a bearing seat may be arranged on the outer side of the second support 36 to realize the rotational connection between the protruding shafts on both ends of the supporting roller 35 and a bearing in the bearing seat. The second support 36 is provided with a concave arc, which can prevent the second support 36 from interfering with the to-be-measured object. After the to-be-measured object and the testing equipment are installed, the first supporting device is descended downward to prevent the interference with the to-be-measured object during the test. The minimum distance between the outer circles of the two rollers is smaller than the outer diameter of the to-be-measured object, such that the to-be-measured object can be effectively supported to prevent the to-be-measured object from falling.

In some embodiments of the present application, the axes of the supporting rollers 35 on both sides may be symmetrically set to be inclined from up to down. An included angle between the axes of the supporting rollers 35 on both sides may be set to an acute angle. A passage that gradually shrinks from top to bottom and allows the to-be-measured object to pass through is formed between the supporting rollers 35 on both sides. In addition, the supporting roller 35 rotates in response to the to-be-measured object being pushed axially, so as to reduce the friction, which facilitates pushing of the to-be-measured object and adjustment of the position of the to-be-measured object in the process of installing the to-be-measured object.

The second supporting device includes a lifting mechanism. The lifting mechanism is arranged on the walking seat. The third bottom plate is connected to the lifting mechanism. The lifting mechanism includes a first sleeve 37, a second sleeve 38, a third sleeve 39 and a second driving mechanism. The first sleeve 37, the second sleeve 38 and the third sleeve 39 are slidably connected from inside to outside in sequence in a sleeving manner. The third sleeve 39 is fixedly connected to the walking seat, and the top end of the first sleeve 37 is connected to the third bottom plate. The second driving mechanism is arranged in the first sleeve, and the second driving mechanism is fixedly connected to the walking seat. The second driving mechanism is configured to drive the first sleeve 37 and the second sleeve 38 to sequentially slide relative to each other in order to adjust the distance of the first supporting device relative to the walking seat.

A first stop block 40 is arranged on a cylinder close to the bottom end of the first sleeve 37, and protrudes from the outer surface of the first sleeve 37. A first limiting block 42 is arranged on the inner surface of the second sleeve 38, and is close to the top end of the second sleeve 38. A second stop block 41 is arranged on the outer surface of the second sleeve 38, and is close to the bottom end of the second sleeve 38. A second limiting block 43 is arranged on the inner surface of the third sleeve 39, and is close to the top end of the third sleeve 39. The first stop block 40 corresponds to the first limiting block 42 in position, and the second stop block 41 corresponds to the second limiting block 43 in position. When the first sleeve 37 is pushed upward, the first stop block 40 pushes the first limiting block 42 to drive the second sleeve 38 to extend upward, the second stop block 41 is in contact with the second limiting block 43, and the second sleeve 38 stops extending upward. The top end of the first sleeve 37 and the bottom surface of the second support 36 may be welded firmly. The heights of the first sleeve 37, the second sleeve 38 and the third sleeve 39 may be set to be equal. When the first sleeve 37 and the second sleeve 38 are pushed out upward completely, the height of the first supporting device may be twice its original height.

The cross-section of each of the first sleeve 37, the second sleeve 38 and the third sleeve 39 may be set to be square or circular. The first stop block 40 may be detachably connected with the first sleeve 37. In addition, the first stop blocks 40 are distributed at intervals along the circumference of the first sleeve 37; or the first stop blocks 40 are symmetrically arranged.

In some embodiments of the present application, the cross-section of each of the first sleeve 37, the second sleeve 38, and the third sleeve 39 is set to be square, so as to prevent the first supporting device from rotating in the lifting process and the descending process. In order to facilitate disassembly, the first stop block 40 may be configured as a bolt which can be tightened on the first sleeve 37. The first stop block 40 is unscrewed and taken out in need of disassembly, and the first sleeve 37 is then pulled out from above. The first stop blocks 40 are distributed at intervals along the circumference of the first sleeve 37 or symmetrically arranged. Similarly, the first stop blocks 42 are distributed at intervals along the circumference of the second sleeve 38 or symmetrically arranged, and the first stop blocks 40 correspond to the first limiting blocks 42 in position. The second stop blocks 41 are distributed at intervals along the circumference of the second sleeve 38, the second stop blocks 43 are distributed at intervals along the circumference of the third sleeve 39, and the second stop blocks 41 correspond to the second limiting blocks 43 in position.

The cross-section of each of the first sleeve 37, the second sleeve 38 and the third sleeve 39 is set to be square. Chock blocks 33 are arranged on the inner wall of each of the second sleeve 38 and the third sleeve 39, and the chock blocks 33 are distributed at intervals along the circumferences of the second sleeve 38 and the third sleeve 39. Since the chock blocks 33 are arranged on the inner wall of the second sleeve 38 and distributed uniformly at intervals along the circumference of the second sleeve 38, the first sleeve 37 can be prevented from rotating during the lifting process and the descending process of the first supporting device, and also from tilting in the lifting process or after lifting. Similarly, since the chock blocks 33 are arranged on the inner wall of the third sleeve 39 and distributed uniformly at intervals along the circumference of the third sleeve 39, the second sleeve 38 can be prevented from rotating during the lifting process and the descending process of the first supporting device, and also from tilting in the lifting process or after lifting. Thus, effective support for the to-be-measured object is ensured, which facilitates smooth lifting and descending of the first sleeve 37 and the second sleeve 38 and greatly reduces jamming accordingly.

The walking seat includes a third base 45 and a walking device. The walking device includes a third motor 47 and an output gear 30. The third base 45 is provided with a first through hole 29. A first mounting plate 28 is arranged on the bottom surface of the third base 45, and is connected to the bottom surface of the third base 45. A mounting flange of the third motor 47 is embedded in the first hole 29, and is connected to the top surface of the first mounting plate 28. The third motor 47 penetrates out of the first hole 29 and extends upward, and an output shaft of the third motor 47 penetrates out of the first mounting plate 28 and extends downward. The output gear 30 is connected to the output shaft of the third motor 47. The third motor 47 may be configured as a cycloid motor. The third motor 47 drives the output gear 30. The output gear 30 meshes with the rack on the pedestal, such that the position of the supporting device provided in the present application can be adjusted to adapt to the to-be-measured objects of different lengths for testing.

The third sleeve 39 includes a connecting flange 44, wherein the top surface of the connecting flange 44 is connected to the bottom end of the third sleeve 39, and the bottom surface of the connecting flange 44 is connected to the top surface of the third base 45. The connecting flange 44 is provided with a second through hole 47. The second sleeve 38 extends into the second hole 47. In addition, the bottom end of the second sleeve 38 is in contact with the top surface of the third base 45. The bottom end of the third sleeve 39 and the connecting flange 44 may be welded firmly, and the connecting flange 44 and the third base 45 may be fixedly connected by a bolt. The second sleeve 38 extends into the second hole 47 and is in contact with the lower third base 45; and when a piston rod of the second oil cylinder 46 is in a retracted state, that is, when the second sleeve 38 is descended to the original position, the second sleeve 38 is supported by the third base 45.

The second driving mechanism includes a second oil cylinder 46 located in the first sleeve 37. The second cylinder 46 is configured as a two-stage oil cylinder. The extension end of a piston rod of the second oil cylinder 46 is connected to the bottom surface of the second support 36. A second mounting flange is arranged on a housing of the second oil cylinder 46, and is connected to the end of the housing away from the protruding piston rod. The bottom surface of the second mounting flange is connected to the top surface of the third base 45.

When the piston rod of the second oil cylinder 46 extends out, the first supporting device is slowly pushed upward by the input hydraulic oil pressure, such that the height of the first supporting device can be twice its original height. Therefore, the second oil cylinder 46 is configured as a two-stage oil cylinder, which has a relatively long working stroke when it is working, and a relatively short working stroke when it is not working. In this way, in the case of a limited installation space, the second oil cylinder 46 may be adaptively installed in the first sleeve 37, such that the structure of the supporting device provided in the present application is more compact and reasonable. The retraction of the piston rod of the second oil cylinder 46 may rely on the own weight of the first supporting device.

A second slider 31 is arranged below the third base 45, wherein the top surface of the second slider 31 is connected to the bottom surface of the third base 45, and the second slider 31 is connected to the linear guide rails in a sliding fit manner. The second slider 31 moves along the linear guide rails. Under the guidance of the linear guide rails, the supporting device provided in the present application is adjusted conveniently to an appropriate position on the pedestal. In addition, the linear guide rails can be used to provide effective support for the supporting device provided in the present application.

Figure 15:
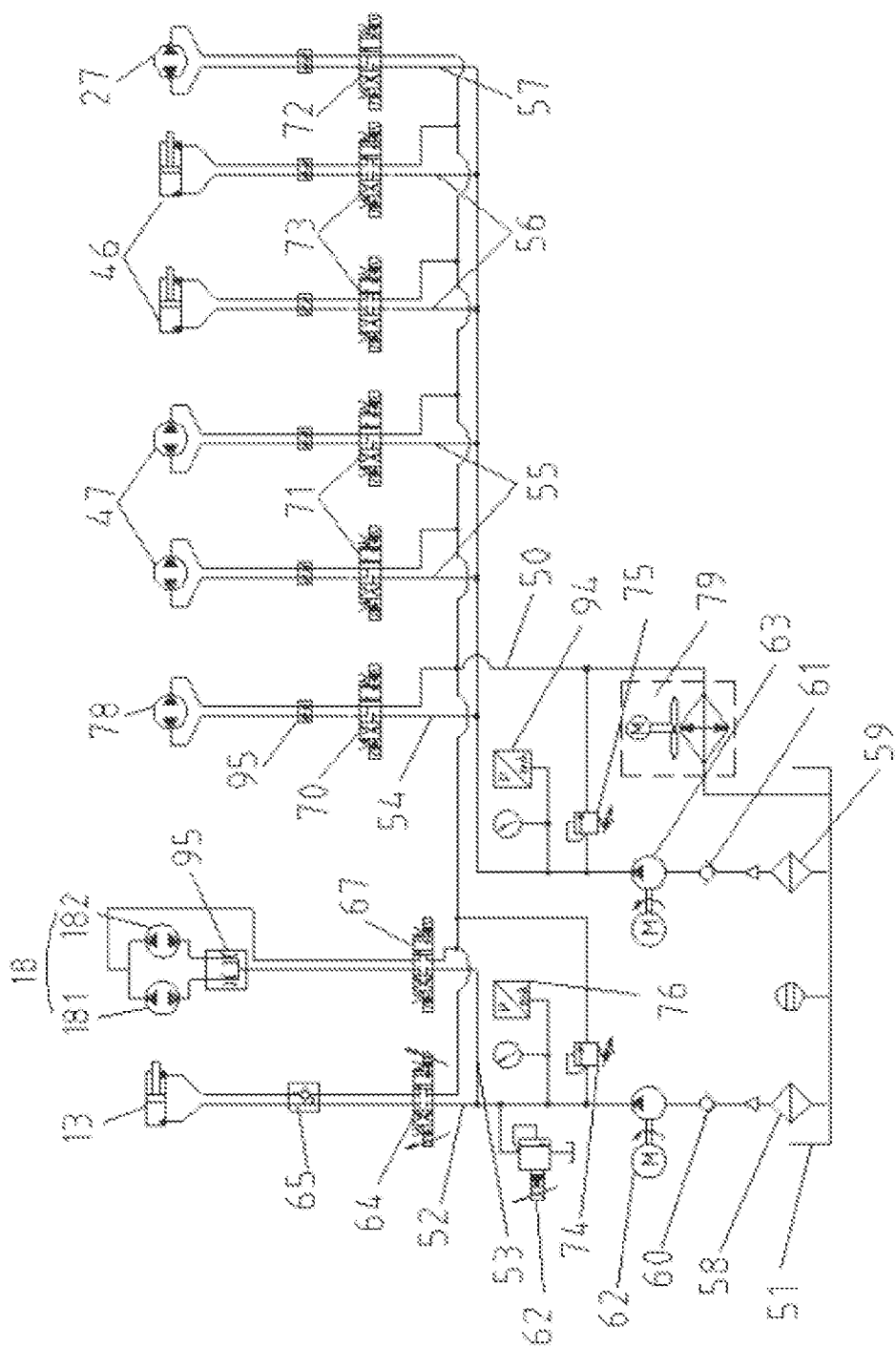
FIG. 15 is a schematic diagram of a hydraulic system.
Figure 16:
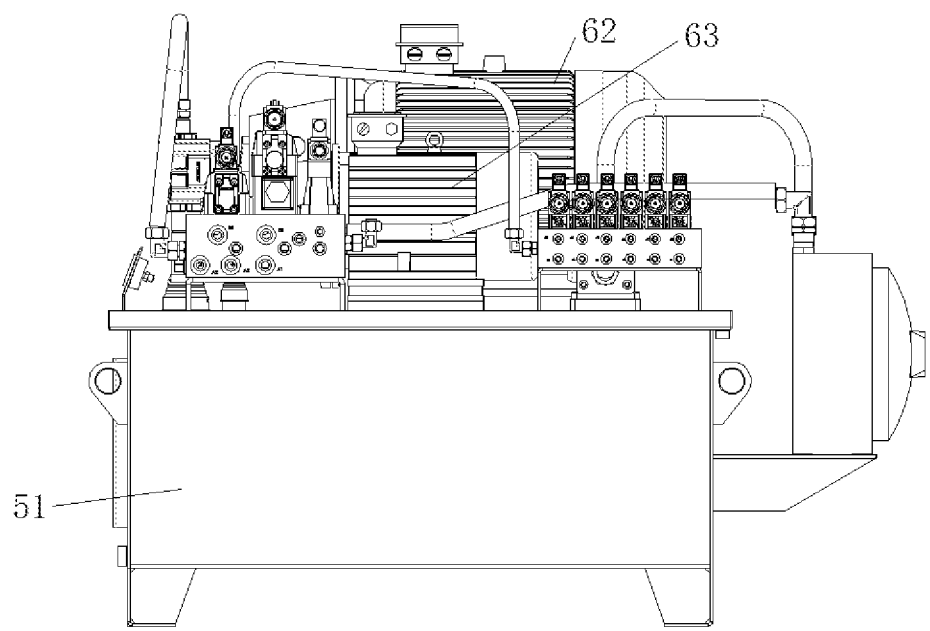
FIG. 16 is a schematic diagram of a design structure of the hydraulic system.

As shown in FIGS. 15 to 16, an embodiment of the present application provides a hydraulic system 600. The hydraulic system 600 includes a hydraulic oil tank 51 which is configured to store oil required by the hydraulic system; a first power system, wherein the input end of the first power system is communicated with the hydraulic oil tank 51, the first power system includes a first output branch 52 and a second output branch 53, the first output branch 52 is communicated with a first oil cylinder mechanism of the deflection loading device, such that the first oil cylinder mechanism drives the to-be-measured object clamped by the deflection loading device to be descended to a target position, and the second output branch 53 is communicated with a first motor mechanism of the deflection loading device, such that the first motor mechanism locks the to-be-measured object after the to-be-measured object is descended to the target position; a second power system, wherein the input end of the second power system is communicated with the hydraulic oil tank 51, the second power system includes a third output branch 54, a fourth output branch 55, a fifth output branch 56, and a sixth output branch 57, the third output branch 54 is communicated with a fourth motor mechanism of the power device, such that the fourth motor mechanism drives the power device to walk along the linear guide rails to a target position, the fourth output branch 55 is communicated with a third motor mechanism of the supporting device, such that the third motor mechanism drives the supporting device to walk along the linear guide rails to a target position, the fifth output branch 56 is communicated with a second oil cylinder mechanism of the supporting device, such that the second oil cylinder mechanism drives the supporting rollers of the supporting device to raise to target positions, and the sixth output branch 57 is communicated with a second motor mechanism of each hinged shaft support such that the second motor mechanism drives the hinged shaft support to walk along the linear guide rails to a target position; and a loop system 50 which is communicated with the first oil cylinder mechanism, the first motor mechanism, the fourth motor mechanism, the third motor mechanism, the second oil cylinder mechanism, and the second motor mechanism respectively, wherein the output end of the loop system 50 is communicated with the hydraulic oil tank 51. By providing sufficient high-pressure oil to hydraulic actuators in the entire system to drive each actuator to actuate, following functions can be achieved: the to-be-measured object clamped by the deflection loading device is descended to the target position, and held and locked, the supporting rollers of the supporting device are driven to raise to target positions, and the supporting device, the hinged shaft supports and the power device are driven to walk along the linear guide rails to the target positions.

The first power system further includes a first filter 58, a first one-way valve 60 and a first motor pump 62 which are communicated in sequence, wherein the input end of the filter is communicated with the hydraulic oil tank 51, and the output end of the first motor pump 62 is communicated with the first output branch 52 and the second output branch 53 respectively. The second power system further includes a second filter 59, a second one-way valve 61 and a second motor pump 63 which are communicated in sequence, wherein the input end of the filter is communicated with the hydraulic oil tank 51, and the output end of the second motor pump 63 is communicated with the third output branch 54, the fourth output branch 55, the fifth output branch 56 and the sixth output branch 57 respectively. Both the first motor pump 62 and the second motor pump 63 may be configured such that a motor is directly connected to a hydraulic pump. The first motor pump 62 may output hydraulic oil with a flow rate of 63 cc/r, and an output pressure of a pipeline is 16 MPa. The second motor pump 63 may output hydraulic oil with a flow rate of 20 cc/r, and an output pressure of a pipeline is 12 MPa. The first output branch 52 and the second output branch 53 are connected in parallel with the output end of the first motor pump 62. In the same way, the third output branch 54, the fourth output branch 55, the fifth output branch 56 and the sixth output branch 57 are connected in parallel with the output end of the second motor pump 63.

The first oil cylinder mechanism includes an electric proportional reversing valve 64, a hydraulic control one-way valve 65 and a first oil cylinder 13, wherein a high-pressure oil input end of the electric proportional reversing valve 64 is communicated with the first output branch 52; the hydraulic control one-way valve 65 is located between the electric proportional reversing valve 64 and the first oil cylinder 13; and the hydraulic control one-way valve 65 is communicated with an oil port at the piston rod side of the first oil cylinder 13. The electric proportional reversing valve 64, the hydraulic control one-way valve 65 and the first oil cylinder 13 are communicated with each other, and the electric proportional reversing valve 64 is configured to switch the oil intake and the oil return of the first oil cylinder 13. An opening degree of the electric proportional reversing valve 64 is adjustable, and the piston rod of the first oil cylinder 13 can be controlled to extend or retract slowly by changing a flow rate of an oil path.

The electric proportional reversing valve 64 is configured as a three-position four-way electric proportional reversing valve. When the electric proportional reversing valve 64 is in a middle position, an oil path supplied to the first oil cylinder 13 is pressure-maintained at this time, and the first oil cylinder 13 is in a stopped state, such that the to-be-measured object clamped by the deflection loading device driven by the first oil cylinder mechanism can be descended to a target position and kept at the target position, thereby ensuring the smooth progress of the test. When one of electromagnetic coils of the electric proportional reversing valve 64 is energized, the electric proportional reversing valve 64 is switched. By switching the electromagnetic coils of the electric proportional reversing valve 64 to be energized, the piston rod of the first oil cylinder 13 can be controlled to extend or retract.

The first motor mechanism of the deflection loading device includes a first electromagnetic reversing valve 67, a first motor A181 and a first motor B182, wherein a high-pressure oil input end of the first electromagnetic reversing valve 67 is communicated with the second output branch 53, and oil ports of the first motor A181 and the first motor B182 are connected in parallel and then communicated with the first electromagnetic reversing valve 67. Since the oil ports of the first motor A181 and the first motor B182 are connected in parallel and then communicated with the first electromagnetic reversing valve 67, the first motor A181 and the first motor B182 can be driven synchronously. In a preferred embodiment of the present application, the first electromagnetic reversing valve 67 is a three-position four-way electromagnetic reversing valve. When the first electromagnetic reversing valve 67 is at the middle position, an oil path supplied to the first motor is pressure-maintained at this time, and the motor is in a stopped state. When one of electromagnetic coils of the first electromagnetic reversing valve 67 is energized, the first electromagnetic reversing valve 67 is switched, and the first motor rotates clockwise to be started at this time. When the other electromagnetic coil of the first electromagnetic reversing valve 67 is energized, a rotation direction of the first motor can be changed.

The fourth motor mechanism of the power device includes a second electromagnetic reversing valve 70 and a fourth motor 78, wherein a high-pressure oil input end of the second electromagnetic reversing valve 70 is communicated with the third output branch 54, and the fourth motor 78 is communicated with the second electromagnetic reversing valve 70. Two fourth output branches 55 are provided. The third motor mechanism of the supporting device includes a third electromagnetic reversing valve 71 and a third motor 47, wherein a high-pressure oil input end of the third electromagnetic reversing valve 71 is communicated with the fourth output branches 55, and the third motor 47 is communicated with the third electromagnetic reversing device 71. The second motor mechanism of each hinged shaft support includes a fourth electromagnetic reversing valve 72 and a second motor 27, wherein a high-pressure oil input end of the fourth electromagnetic reversing valve 72 is communicated with the sixth output branch 57, and the second motor 27 is communicated with the four electromagnetic reversing valves 72. The stress fatigue testing equipment includes two supporting devices which are arranged at intervals on the linear guide rails of the pedestal and which are configured to support the to-be-measured object prior to installation. In order to adapt to to-be-measured objects of different lengths, the supporting devices can be driven by the third motor 47 to walk along the linear guide rails. The third electromagnetic reversing valve 71 may be configured to control the switching of oil intake and oil return, such that the third motor 47 rotates clockwise or anticlockwise to be started, thereby driving the supporting devices to move forward or backward. Similarly, the power device is driven by the fourth motor 78 to walk along the linear guide rails. The second electromagnetic reversing valve 70 may be configured to control the switching of oil intake and oil return, such that the fourth motor 47 rotates clockwise or anticlockwise to be started, thereby driving the power device to move forward or backward. The hinged shaft supports are driven by the second motor 27 to walk along the linear guide rails. The fourth electromagnetic reversing valve 72 may be configured to control the switching of oil intake and oil return, such that the second motor 27 rotates clockwise or anticlockwise to be started, thereby driving the hinged shaft supports to move forward or backward. In some embodiments of the present application, the second motor 27, the third motor 47 and the fourth motor 78 may be configured as hydraulic motors of the same specification and model; the second electromagnetic reversing valve 70, the third electromagnetic reversing valve 71 and the fourth electromagnetic reversing valve 72 may be selected as three-position four-way electromagnetic reversing valves of the same specification and model; and a two-way throttle valve 95 may be arranged between the motor and the electromagnetic reversing valve to flexibly adjust the flow rate of a pipeline.

Two fifth output branches 56 are provided. The second oil cylinder mechanism of the supporting device includes a fifth electromagnetic reversing valve 73 and a second oil cylinder 46, wherein a high-pressure oil input end of the fifth electromagnetic reversing valve 73 is communicated with the fifth output branches 56, and the second oil cylinder 46 is communicated with the fifth electromagnetic reversing valve 73. The two fifth output branches 56 are connected in parallel, and respectively configured to control the supporting rollers of the two supporting devices to be lift and descended. The fifth electromagnetic reversing valve 73 is configured to control the switching of oil intake and oil return, such that a piston rod of the second oil cylinder 46 extends or retracts, so as to control the supporting rollers of the supporting devices to be lift or descended.

A first overflow valve 74 is connected to the output end of the first motor pump 62 in parallel, wherein the output end of the first overflow valve 74 is communicated with the loop system 50. A second overflow valve 75 is connected to the output end of the second motor pump 63 in parallel, wherein the output end of the second overflow valve 75 is communicated with the loop system 50. An air-cooled radiator 79 is arranged on the loop system 50, and is close to the hydraulic oil tank 51. When an oil path output by the first motor pump 62 exceeds a certain pressure, the hydraulic oil can be drained to the loop system 50 through the first overflow valve 74 and flow back to the hydraulic oil tank 51. Similarly, when an oil path output by the second motor pump 63 exceeds a certain pressure, the hydraulic oil can be drained to the loop system 50 through the second overflow valve 75 and flow back to the hydraulic oil tank 51. The air-cooled radiator 79 can be driven by a motor to cool the returning hydraulic oil.

A first pressure gauge 76 and an electric proportional pressure reducing valve 77 are sequentially arranged on a pipeline of the first power system, and are close to the output end of the first motor pump 62. A second pressure gauge 94 is arranged on a pipeline of the second power system, and is close to the output end of the second motor pump 63. The electric proportional pressure reducing valve 77 makes the pressure of the output hydraulic oil more stable. When the output oil path exceeds a certain pressure, the hydraulic oil can be drained to the hydraulic oil tank, thereby ensuring the safety and stability of the oil path.

In some embodiments of the present application, the hydraulic oil tank 51 may be arranged below, and various hydraulic components are integrated on a table of the hydraulic oil tank 51.

Figure 17:
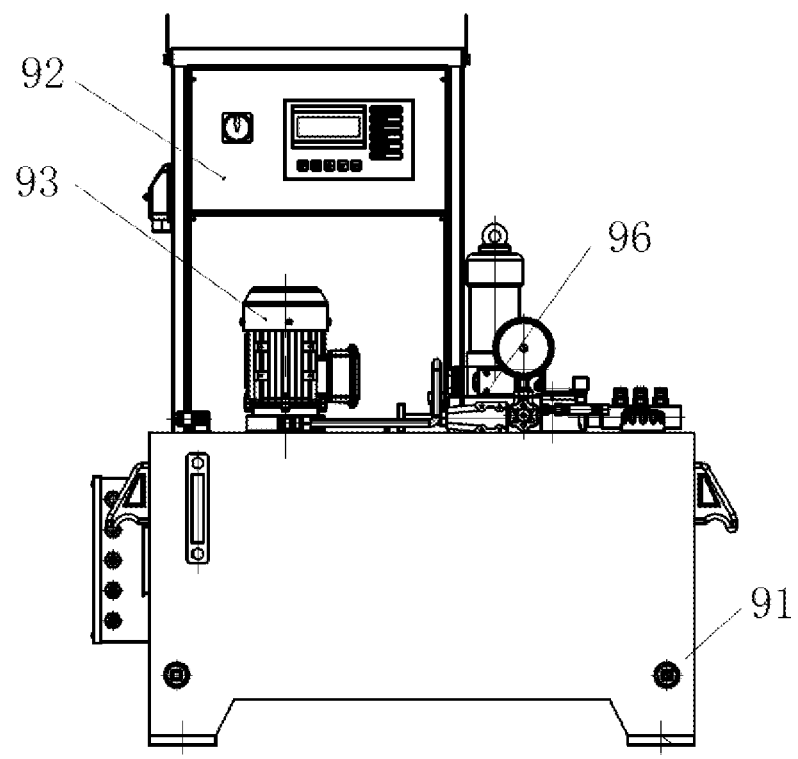
FIG. 17 is a schematic diagram of a design structure of a lubricating system.

As shown in FIG. 17, the alternating stress fatigue testing equipment further includes a lubricating system 700 which is configured to lubricate and cool rotating bearings. The lubricating system includes a lubricating oil tank 91 configured to store oil required by the hydraulic system, wherein a temperature sensor is arranged inside the lubricating oil tank 91, and configured to detect the temperature of lubricating oil in the lubricating oil tank 91; an oil cooler 92 configured to cool the lubricating oil in the lubricating oil tank 91; and a lubricating oil pump 93, wherein the input end of the lubricating oil pump 93 is connected to the lubricating oil tank 91, wherein an integrated block 96 is connected to the output end of the lubricating oil pump 93, the output end of the integrated block 96 is connected to each bearing seat through a hose, and an oil return opening of each bearing seat is connected to the lubricating oil tank 91 through a hose. In some embodiments of the present application, thin oil may be selected as the lubricating oil, such that oil path circulation can be formed by continuously conveying the thin oil, thereby lubricating and cooling each rotating bearing. When the temperature of the lubricating oil in the lubricating oil tank 91 detected by the temperature sensor reaches a set temperature, the temperature sensor sends the detected temperature to a processor. The processor processes the detected temperature and sends a start signal to the oil cooler 92. The oil cooler 92 is automatically switched on to cool the lubricating oil forcibly. The integrated block 96 may include components such as a pressure regulating valve, a throttle valve and a distributor which may be integrally installed, making the oil path system more compact and reducing transition joints. The lubricating oil pump 93 is connected to the pressure regulating valve and the throttle valve in sequence. The distributor may be arranged at the output end of the throttle valve. Several connection joints, which may be connected to respective bearing seats through hoses, are arranged on the distributor. In this way, the lubrication system may be configured as a closed circulation system to convey the lubricating oil to each lubrication point, and also bring bearing heat back to the oil tank along with the lubricating oil, which can not only ensure the full lubrication of the bearings, but also monitor the heating condition of the bearings at any time, and reduce the temperature and dissipate heat in time, thereby ensuring the normal operation of the bearings.

A working principle of the testing equipment is as follows.

1) Before the to-be-measured object is installed, the first oil cylinder is started to raise the first bearing seat of the deflection loading device to the highest position for the to-be-measured object to penetrate.
2) The second oil cylinder is started to raise the supporting rollers of the supporting devices arranged at intervals on both sides of the pedestal to a certain height position, such that when the to-be-measured object is placed on the supporting rollers and when the to-be-measured object passes through a central hole of the first bearing seat, the axis of the to-be-measured object is kept horizontal.
3) The to-be-measured object is hoisted in place by using a crane, and the midpoint of the to-be-measured object should be labeled in advance prior to installation so as to ensure that it is symmetrical after installation.
4) After the to-be-measured object passes through the first bearing seat, the upper and lower expansion sleeves are installed, and bolts on the upper and lower expansion sleeves are sequentially tightened to ensure that they are tightly integrated with the bearing of the first bearing seat.
5) The hinged shaft supports and the power device on the pedestal are moved to target positions, two ends of the to-be-measured object are fixedly connected with the connecting shafts of the hinged shaft supports, and meanwhile, the U-shaped clamping blocks are used to fix the hinged shaft supports and the power device.
6) The supporting devices are descended to the lowest position, and moved to the front of the power device and the hinged shaft supports respectively to prevent interference when the to-be-measured object is bent.
7) The first oil cylinder is started to descend the first bearing seat of the deflection loading device to the target position, such that the to-be-measured object reaches a set bending angle; at this time, the first motor is started, and the screw nut moves downward with the rotation of the screw rod until pushing against a boss of the first bearing seat; and the first motor stops, then the screw rod assembly locks this position by means of the self-locking function.
8) in this case, the hydraulic system stops operating, and meanwhile, the motor of the power device is started; the speed reducer and the hinged shaft supports drive the to-be-measured object to rotate at a set rotation speed; and when a set test time is reached, the equipment is stopped and the to-be-measured object is then detected.

Therefore, the above descriptions should be considered as illustrative but not restrictive. For example, the above-mentioned examples (or one or more solutions thereof) can be used in combination with each other, and it is also considered that these embodiments can be combined with each other in various combinations or permutations. The scope of the present application should be determined with reference to the full scope of the appended claims and equivalent forms entitled by these claims.

What is claimed is:

1. An alternating stress fatigue test equipment, comprising:
   a base (200) on which linear guide rails are provided;
   a deflection loading device (100) being arranged on the base and used to drive a clamped object to be measured to slide to a first position, so that the to-be-measured object is bent to a target degree and maintained, and the deflection loading device (100) is rotationally connected with the to-be-measured object;
   two hinge shaft supports (300) being arranged on the linear guide rails, wherein the hinge shaft supports (300) are symmetrically arranged along the longitudinal central line of the deflection loading device (100), the hinge shaft supports (300) are used to being connected with two ends of the to-be-measured object, respectively, and the hinge shaft supports (300) are configured to be capable of being obliquely adjusted, so as to adapt to the bending of the to-be-measured object to the target degree;
   a power device (400) being arranged on the linear guide rail, and the power device (400) is in transmission connection with one of the hinge shaft support (300), so that the power device (400) can drive the to-be-measured object to rotate, wherein:
   the deflection loading device (100) comprises:
   a supporting mechanism (11), wherein the supporting mechanism (11) is provided with a slideway (19), and the slideway (19) is arranged in a height direction of the supporting mechanism (11);
   a loading connection mechanism being connected with the supporting mechanism (11) and used to rotationally clamp the to-be-measured object, wherein the loading connection mechanism comprises a first sliding block (104), the first sliding block (104) is connected with the sliding way (19) in a sliding fit manner, and when the loading connection mechanism slides to a first position relative to the supporting mechanism, so that the to-be-measured object is bent to the target degree;
   a first driving mechanism being connected with the loading connection mechanism and used to drive the loading connection mechanism to slide relative to the supporting mechanism;
   a locking mechanism being arranged on the supporting mechanism (11), and the locking mechanism is used to limit the loading connection mechanism, so that the loading connection mechanism is kept at the first position relative to the supporting mechanism; wherein:

the locking mechanism comprises a leading screw locking assembly, wherein the leading screw locking assembly comprises a screw rod (12) and a screw nut (17), the screw rod (12) is arranged in the slideway, two ends of the screw rod (12) are rotationally connected with the supporting mechanism (11), the screw nut (17) is connected with the screw rod (12) in a fit manner, and the screw nut (17) moves in the slideway; and the first sliding block has a first hole for enabling the screw rod (12) to pass through, when the first driving mechanism drives the loading connection mechanism to move to the first position, the screw rod drives the screw nut (17) to tightly abut against the first sliding block to overcome elastic force generated by the bending of the to-be-measured object, so that the loading connection mechanism is kept at the first position relative to the supporting mechanism (11).

2. The alternating stress fatigue test equipment according to claim 1, wherein the supporting mechanism (11) comprises supporting frames (111) and a first base (14), the supporting frames (111) are symmetrically arranged, the bottom end of the supporting frame (111) is connected with the first base (14), a channel is formed between the supporting frames (111) at two sides, and the loading connection mechanism moves in the channel;

the loading connection mechanism further comprises a first bearing seat (10) and a clamping assembly, wherein a first bearing (16) is arranged in the first bearing seat (10), an outer ring of the first bearing (16) is fixed with the first bearing seat (10), and the clamping assembly is used to fix the to-be-measured object which passes through an inner ring of the first bearing (16) with the inner ring of the first bearing (16);

the clamping assembly is set as an expansion sleeve, the clamping assembly comprises an upper expansion sleeve (151) and a lower expansion sleeve (152), the upper expansion sleeve (151) and the lower expansion sleeve (152) are arranged in pairs, outer circles of the upper expansion sleeve (151) and the lower expansion sleeve (152) are conical, and the outer circles of the upper expansion sleeve (151) and the lower expansion sleeve (152) are gradually shrunk along an axis of the to-be-measured object; and a spacer bush (102) is arranged between the first bearing (16) and the clamping assembly, an outer diameter of the clamping assembly matches an inner hole of the spacer bush (102), and an outer diameter of the spacer bush (102) matches an inner hole of the first bearing (16).

3. The alternating stress fatigue test equipment according to claim 1, wherein the base (200) comprises a bottom beam (80), a rack (81) and the linear guide rails (82), the rack (81) and the linear guide rail are both connected with a top surface of the bottom beam (80), and the linear guide rails (82) are symmetrically arranged;

a groove (83) is formed in the middle of the bottom beam (80), the cross section of the groove (83) is in a trapezoid shape with a narrow lower part and a wide upper part, and the groove extends in a length direction of the bottom beam (80); and the rack (81) is disposed between the linear guide rails (82) on both sides, and the teeth of the rack (81) face toward the grooves (83).

4. The alternating stress fatigue test equipment according to claim 1, wherein the power device (400) comprises a rotary driving mechanism, the rotary driving mechanism comprises a motor (84), a speed reducer (85), a rotating shaft (86), a third bearing seat (87) and a cardan shaft (88), the motor (84) and the speed reducer (85) are connected through a coupler, the rotating shaft (86) is rotationally connected with the third bearing seat (87), the third bearing seat (87) is exposed at both ends of the rotating shaft (86), the other end of the speed reducer (85) away from the motor is connected with the rotating shaft (86), the other end of the rotating shaft (86) is connected with the cardan shaft (88), and the other end of the cardan shaft away from the third bearing seat (87) is connected with the hinge shaft supports (300);

a sensor (89) is arranged between the speed reducer (85) and the third bearing seat, and the sensor (89) is used to detect output torque and rotational speed of the speed reducer (85);

the power device (400) further comprises a power base (90), the power base (90) is configured as a box body structure, and the rotary driving mechanism is connected with a top plate of the power base (90);

the power device (400) further comprises a traveling device, the traveling device comprises a fourth motor (78) and an output gear (30), the fourth motor (78) is located in an inner space of the box body structure, a sealing plate on one side of the box body structure and the box body structure of the power base are detachable, an output shaft of the fourth motor (78) penetrates out of a bottom plate of the power base downwards, and the output gear (30) is connected with an output shaft of the fourth motor (78); and the power base further comprises a sliding block (31), a top surface of the sliding block (31) is connected with the bottom plate of the power base (90), and the sliding block (31) is connected with the linear guide rails (82) in a sliding fit mode.

5. The alternating stress fatigue test equipment according to claim 1, wherein the hinge shaft supports (300) comprise:

a first support mechanism;

a rotating mechanism being rotationally connected with the support mechanism;

a connecting shaft (21) being in transmission connection with the rotating mechanism, and one end of the connecting shaft (21) being used for being connected and fixed with one end of the to-be-measured object; and a rotation axis of the connecting shaft (21) is perpendicular to the rotation axis of the rotating mechanism.

6. The alternating stress fatigue test equipment according to claim 1, further comprising two supporting devices (500) respectively disposed at two sides of the deflection loading device (100), and the supporting devices (500) are arranged at intervals on the base (200), and the supporting devices comprise:

a traveling machine base;

a second supporting device being arranged on the traveling machine base, and the second supporting device is telescopic in a direction perpendicular to the traveling machine base; and a first supporting device being connected with the second supporting device, the telescopic adjustment of the second supporting device is used for adjusting the distance between the first supporting device and the traveling machine base, and the first supporting device is used to support the to-be-measured object.

7. The alternating stress fatigue test equipment according to claim 1, further comprising a hydraulic system (600), which comprises:

a hydraulic oil tank (51) used to store oil needed by the hydraulic system;

a first power system, an input end thereof being communicated with the hydraulic oil tank (51), wherein the first power system comprises a first output branch (52) and a second output branch (53), and the first output branch (52) is communicated with a first oil cylinder mechanism of the deflection loading device, so that the first oil cylinder mechanism drives the to-be-measured object clamped by the deflection loading device to descend to a target position; and the second output branch (53) is communicated with a first motor mechanism of the deflection loading device, so that the first motor mechanism locks the to-be-measured object after the to-be-measured is lowered to the target position;

a second power system, an input end thereof being communicated with the hydraulic oil tank (51), wherein the second power system comprises a third output branch (54), a fourth output branch (55), a fifth output branch (56) and a sixth output branch (57), and the third output branch (54) is communicated with a fourth motor mechanism of the power device, so that the fourth motor mechanism drives the power device to travel to the target position along the linear guide rails; the fourth output branch (55) is communicated with a third motor mechanism of the supporting devices, so that the third motor mechanism drives the supporting devices to travel to the target position along the linear guide rails; the fifth output branch (56) is communicated with a second oil cylinder mechanism of the supporting devices, so that the second oil cylinder mechanism drives a supporting roller of the supporting devices to ascend to the target position; and the sixth output branch (57) is communicated with the second motor mechanism of the hinge shaft supports, so that the second motor mechanism drives the hinge shaft supports to walk to the target position along the linear guide rails; and a loop system (50) being respectively communicated with return oil paths of the first oil cylinder mechanism, the first motor mechanism, the fourth motor mechanism, the third motor mechanism, the second oil cylinder mechanism and the second motor mechanism, and an output end of the loop system (50) is communicated with the hydraulic oil tank (51).

8. The alternating stress fatigue test equipment according to claim 1, further comprising a lubrication system (700), which is used to lubricate and cool the rotating bearing, wherein the lubrication system comprises:

a lubricating oil tank (91) being used to store oil needed by the hydraulic system, a temperature sensor being arranged in the lubricating oil tank (91), and a temperature sensor being used to detect the temperature of lubricating oil in the lubricating oil tank (91);

an oil cooler (92) being used to cool the lubricating oil in the lubricating oil tank (91); and an lubricating oil pump (93), an input end thereof being connected with the lubricating oil tank (91), an integrated block (96) being connected with the output end of the lubricating oil pump (93), an output end of the integrated block (96) being connected with each bearing seat through a hose, and an oil return port of each bearing seat being connected with the lubricating oil tank (91) through the hose.

* * * * *